(12) United States Patent
Broering et al.

(10) Patent No.: US 10,081,169 B2
(45) Date of Patent: *Sep. 25, 2018

(54) MULTI-LAYERED LIGHTLY-LAMINATED FILMS AND METHODS OF MAKING THE SAME

(71) Applicant: The Glad Products Company, Oakland, CA (US)

(72) Inventors: Shaun T. Broering, Fort Thomas, KY (US); Robert W. Fraser, Lombard, IL (US); Michael G. Borchardt, Willowbrook, IL (US); Jack A. MacPherson, Aurora, IL (US); Robert T. Dorsey, Willowbrook, IL (US); Scott W. Binger, Bridgeview, IL (US); Kenneth E. Cisek, Willowbrook, IL (US); Matthew W. Waldron, West Chester, OH (US); Angelli S. Denmon, Hamilton, OH (US)

(73) Assignee: The Glad Products Company, Oakland, CA (US)

( * ) Notice: Subject to any disclaimer, the term of this patent is extended or adjusted under 35 U.S.C. 154(b) by 490 days.

This patent is subject to a terminal disclaimer.

(21) Appl. No.: 14/883,397

(22) Filed: Oct. 14, 2015

(65) Prior Publication Data
US 2016/0039169 A1 Feb. 11, 2016

Related U.S. Application Data

(60) Division of application No. 13/299,177, filed on Nov. 17, 2011, now Pat. No. 9,186,862, which is a
(Continued)

(51) Int. Cl.
B32B 1/02 (2006.01)
B32B 37/00 (2006.01)
(Continued)

(52) U.S. Cl.
CPC ............ *B32B 37/0076* (2013.01); *B32B 3/10* (2013.01); *B32B 3/28* (2013.01); *B32B 7/045* (2013.01);
(Continued)

(58) Field of Classification Search
CPC .. B32B 1/02; B32B 3/28; B32B 27/08; B32B 37/203; B32B 38/06; B32B 2307/5825;
(Continued)

(56) References Cited

U.S. PATENT DOCUMENTS 2,714,571 A 8/1955 Irion et al.
3,058,868 A 10/1962 Schroeder
(Continued)

FOREIGN PATENT DOCUMENTS

WO WO1990013702 11/1990
WO WO1999056953 11/1999

OTHER PUBLICATIONS

International Search Report, dated Jan. 22, 2013, from counterpart PCT/US12/65628, filing date Nov. 16, 2012.

*Primary Examiner* — Marc A Patterson
(74) *Attorney, Agent, or Firm* — Thomas C. Feix

(57) ABSTRACT

Apparatus and methods for creating multi-layered lightly-laminated provide films with increased or maintained strength. An increased level of strength is achieved by bonding adjacent layers of the multi-layer film together in a manner that the bond strength of the laminated layers is less than a strength of a weakest tear resistance of the individual first and second film layers. The inventors have surprisingly found that such a configuration of light bonding provides increased and unexpected strength properties to the multi-layer film as compared to a monolayer film of equal thickness or a multi-layer film in which the plurality of layers are tightly bonded together.

10 Claims, 35 Drawing Sheets

Related U.S. Application Data continuation-in-part of application No. 12/947,025, filed on Nov. 16, 2010, now Pat. No. 8,603,609.

(60) Provisional application No. 61/261,673, filed on Nov. 16, 2009.

(51) Int. Cl.

| | | |
|---|---|---|
| *B32B 7/06* | (2006.01) | |
| *B32B 7/04* | (2006.01) | |
| *B32B 27/08* | (2006.01) | |
| *B32B 3/10* | (2006.01) | |
| *B32B 3/28* | (2006.01) | |
| *B32B 37/20* | (2006.01) | |
| *B32B 38/00* | (2006.01) | |
| *B32B 38/06* | (2006.01) | |
| *B32B 1/08* | (2006.01) | |
| *B32B 3/26* | (2006.01) | |

(52) U.S. Cl.
CPC ............... *B32B 7/06* (2013.01); *B32B 27/08* (2013.01); *B32B 37/203* (2013.01); *B32B 38/0012* (2013.01); *B32B 38/06* (2013.01); *B32B 3/26* (2013.01); *B32B 2307/51* (2013.01); *B32B 2307/54* (2013.01); *B32B 2307/558* (2013.01); *B32B 2307/5825* (2013.01); *B32B 2398/20* (2013.01); *B32B 2439/46* (2013.01); *Y10T 156/1039* (2015.01); *Y10T 428/1352* (2015.01); *Y10T 428/24612* (2015.01); *Y10T 428/24802* (2015.01); *Y10T 428/24942* (2015.01)

(58) Field of Classification Search
CPC .......... B32B 2439/46; Y10T 428/1352; Y10T 428/24612
See application file for complete search history.

(56) References Cited

U.S. PATENT DOCUMENTS

| | | |
|---|---|---|
| 3,622,422 A | 11/1971 | Newman et al. |
| 3,857,144 A | 12/1974 | Bustin |
| 4,116,892 A | 9/1978 | Schwarz |
| 4,153,664 A | 5/1979 | Sabee |
| 4,153,751 A | 5/1979 | Schwarz |
| 4,264,392 A | 4/1981 | Watt |
| 4,289,832 A | 9/1981 | Schwarz |
| 4,302,495 A | 11/1981 | Marra |
| 4,343,848 A | 9/1982 | Leonard, Jr. |
| 4,379,197 A | 4/1983 | Cipriani |
| 4,410,582 A | 10/1983 | Tsunashima et al. |
| 4,438,167 A | 3/1984 | Schwarz |
| 4,517,714 A | 5/1985 | Sneed et al. |
| 4,522,203 A | 6/1985 | Mays |
| 4,614,679 A | 9/1986 | Farrington, Jr. et al. |
| 4,692,368 A | 9/1987 | Taylor et al. |
| 4,704,238 A | 11/1987 | Okuyama et al. |
| 4,753,840 A | 6/1988 | Van Gompel |
| 4,930,905 A | 6/1990 | Sharps, Jr. |
| 5,035,941 A | 7/1991 | Blackburn |
| 5,076,440 A | 12/1991 | Drummond |
| 5,100,721 A | 3/1992 | Akao |
| 5,236,533 A | 8/1993 | Imai et al. |
| 5,296,184 A | 3/1994 | Wu et al. |
| 5,382,461 A | 1/1995 | Wu |
| 5,422,172 A | 6/1995 | Wu |
| 5,518,801 A | 5/1996 | Chappell et al. |
| 5,851,937 A | 12/1998 | Wu et al. |
| 5,861,074 A | 1/1999 | Wu |
| 5,865,926 A | 2/1999 | Wu et al. |
| 6,013,151 A | 1/2000 | Wu et al. |
| 6,214,147 B1 | 4/2001 | Mortellite et al. |
| 6,265,045 B1 | 7/2001 | Mushaben |
| 6,254,736 B1 | 8/2001 | Chrismore et al. |
| 6,284,344 B1 | 9/2001 | Barnes et al. |
| 6,361,784 B1 | 3/2002 | Brennan et al. |
| 6,385,818 B1 | 5/2002 | Savicki, Sr. |
| 7,306,729 B2 | 12/2007 | Bacino et al. |
| 9,186,862 B2 * | 11/2015 | Broering ................. B32B 7/045 |
| 2002/0074691 A1 | 6/2002 | Mortellite et al. |
| 2004/0170810 A1 | 9/2004 | Rasmussen |
| 2005/0208854 A1 | 9/2005 | Sadato et al. |
| 2007/0166503 A1 | 7/2007 | Hannigan |
| 2007/0202284 A1 | 8/2007 | True |
| 2008/0124461 A1 | 5/2008 | Leener et al. |
| 2009/0029114 A1 | 1/2009 | Cancio et al. |
| 2009/0233041 A1 | 9/2009 | Rasmussen |
| 2011/0117307 A1 | 5/2011 | Fraser et al. |

\* cited by examiner

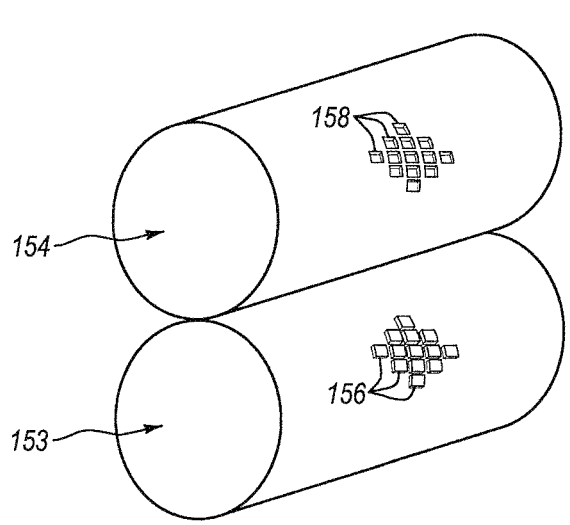
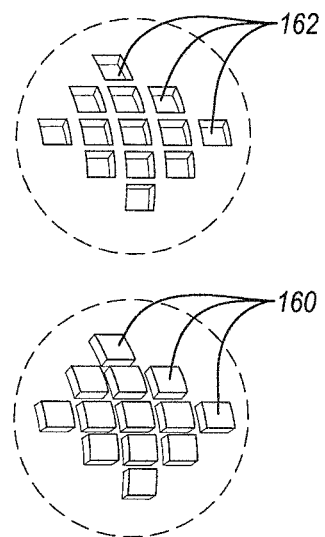
Fig. 11A
Fig. 11B
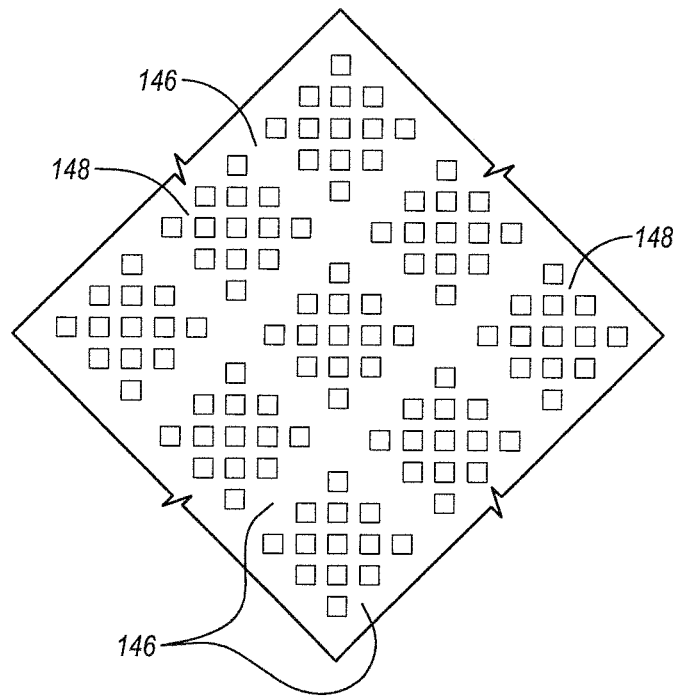
Fig. 11C

| Sample | Film ID | Pattern Run | Bond Level | Mean MD Tear (gf) | Mean TD Tear (gf) |
|---|---|---|---|---|---|
| EX 32 - 1 | C | 0 | L | 1110 | 952 |
| EX 32 - 2 | C | 2 | L | 820 | 994 |
| EX 32 - 3 | C | 3 | L | 762 | 816 |
| EX 32 - 4 | C | 4 | L | 930 | 946 |
| EX 32 - 5 | C | 5 | L | 776 | 841 |
| EX 32 - 6 | C | 6 | H | 327 | 326 |
| EX 32 - 7 | C | 7 | H | 892 | 877 |
| EX 32 - 8 | A | 0 | L | 785 | 908 |
| EX 32 - 9 | A | 2 | L | 758 | 1021 |
| EX 32 - 10 | A | 3 | L | 776 | 734 |
| EX 32 - 11 | A | 4 | L | 791 | 888 |
| EX 32 - 12 | A | 5 | L | 822 | 994 |
| EX 32 - 13 | A | 6 | H | 465 | 522 |
| EX 32 - 14 | A | 7 | H | 823 | 984 |
| EX 32 - 15 | B | 0 | L | 620 | 1065 |
| EX 32 - 16 | B | 2 | L | --- | 964 |
| EX 32 - 17 | B | 3 | L | 547 | 693 |
| EX 32 - 18 | B | 4 | L | 368 | 792 |
| EX 32 - 19 | B | 5 | L | 539 | 1482 |
| EX 32 - 20 | B | 6 | H | 186 | 499 |
| EX 32 - 21 | B | 7 | H | 471 | 922 |
| EX 32 - 22 | C | 0 | H | 516 | 936 |
| EX 32 - 23 | C | 1 | H | 527 | 769 |
| EX 32 - 24 | C | 2 | H | 410 | 637 |
| EX 32 - 25 | C | 3 | H | 148 | 592 |
| EX 32 - 26 | A | 0 | H | 478 | 1212 |
| EX 32 - 27 | A | 1 | H | 431 | 824 |
| EX 32 - 28 | A | 2 | H | 389 | 683 |
| EX 32 - 29 | A | 3 | H | 245 | 686 |
| EX 32 - 30 | B | 0 | H | 461 | 1140 |
| EX 32 - 31 | B | 1 | H | 279 | 877 |
| EX 32 - 34 | B | 2 | H | 362 | 726 |
| EX 32 - 35 | B | 3 | H | 272 | 730 |
| EX 32 - 36 | C | 4 | H | 664 | 610 |
| EX 32 - 37 | C | 5 | H | 493 | 715 |
| EX 32 - 38 | A | 4 | H | 771 | 693 |
| EX 32 - 39 | A | 5 | H | 428 | 781 |
| EX 32 - 40 | B | 4 | H | 492 | 630 |
| EX 32 - 41 | B | 5 | H | 429 | 804 |
| EX 32 - 42 | C | Base - None | None | 257 | 424 |
| EX 32 - 43 | A | Base - None | None | 350 | 440 |
| EX 32 - 44 | B | Base - None | None | 280 | 463 |

*Fig. 32*

MULTI-LAYERED LIGHTLY-LAMINATED FILMS AND METHODS OF MAKING THE SAME

CROSS-REFERENCE TO RELATED APPLICATIONS

The present application is a divisional of U.S. patent application Ser. No. 13/299,177, filed Nov. 17, 2011 and entitled MULTI-LAYERED LIGHTLY-LAMINATED FILMS AND METHODS OF MAKING THE SAME, which is a continuation in part of U.S. patent application Ser. No. 12/947,025, filed Nov. 16, 2010, now U.S. Pat. No. 8,603,609, issued Dec. 10, 2013 and entitled DISCONTINUOUSLY LAMINATED FILM, which claims the benefit of U.S. Provisional Application No. 61/261,673, filed Nov. 16, 2009. Each of the above-referenced applications is hereby incorporated by reference in its entirety.

BACKGROUND OF THE INVENTION

1. The Field of the Invention

The present invention relates generally to thermoplastic films. Specifically, the invention relates to stretched thermoplastic films with visually distinct regions created by stretching the films.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength, tear resistance, and impact resistance of a thermoplastic film. One way manufacturers may attempt to control or change the material properties of a thermoplastic film is by stretching the film. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between two pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are spaced across the film. The depth at which the intermeshing teeth engage can control the degree of stretching. Often, incremental stretching of films is referred to as ring rolling.

In addition to allowing for the modification or tailoring of the strength of a film, stretching of a film can also reduce the thickness of the film. Stretched films of reduced thickness can allow manufacturers to use less thermoplastic material to form a product of a given surface area or size. Unfortunately, stretching thermoplastic using conventional methods can weaken the film.

One common use of thermoplastic films is as bags for liners in trash or refuse receptacles. Another common use of thermoplastic films is as flexible plastic bags for storing food items.

BRIEF SUMMARY OF THE INVENTION

Implementations of the present invention solve one or more problems in the art with apparatus and methods for creating multi-layered lightly-laminated films with increased strength. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

For example, one implementation of a multi-layered lightly-laminated thermoplastic film includes a first film layer and a second film layer. The multi-layered lightly-laminated thermoplastic film includes a plurality of bonded regions in which the first and second film layers are bonded together and a plurality of unbonded regions dispersed about the plurality of bonded regions. The unbonded regions include discrete first and second film layers that are not bonded to one another. A bond strength of the bonded regions is less than a weakest tear resistance of either the first or second film layers.

Other implementations of the present invention include a thermoplastic bag having first and second layers of thermoplastic material. Each of the first layer and the second layer include first and second side walls joined along a bottom edge, a first side edge, and an opposing second side edge. A plurality of bonds secures the first layer to the second layer of the bag. The bonds provide less resistive force to an applied strain than molecular-level deformation of either the first or second layers of thermoplastic material.

In addition to the forgoing, a method for bonding a plurality of film layers together to create a multi-layered lightly-laminated film exhibiting increased strength is provided. Such a method can involve providing first and second film layers of a thermoplastic material. The method can also involve bonding the first film layer to the second film layer by forming a plurality of bond regions between the first film layer and the second film layer that have a bond strength less than a force required to fail either the first film layer or the second film layer.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIG. 11A illustrates a schematic diagram of another implementation of intermeshing rollers for use in accordance with one or more implementations of the present invention;

FIG. 11B illustrates a close up of the protrusions and intermeshing recessions of the rollers of FIG. 11A;

FIG. 11C illustrates a view of a multi-layered lightly-laminated thermoplastic film created by the intermeshing rollers of FIG. 11A;

FIG. 32 is a table including the data associated with the multi-layered lightly-laminated films tested in FIG. 31.

DETAILED DESCRIPTION

Figure 1A:
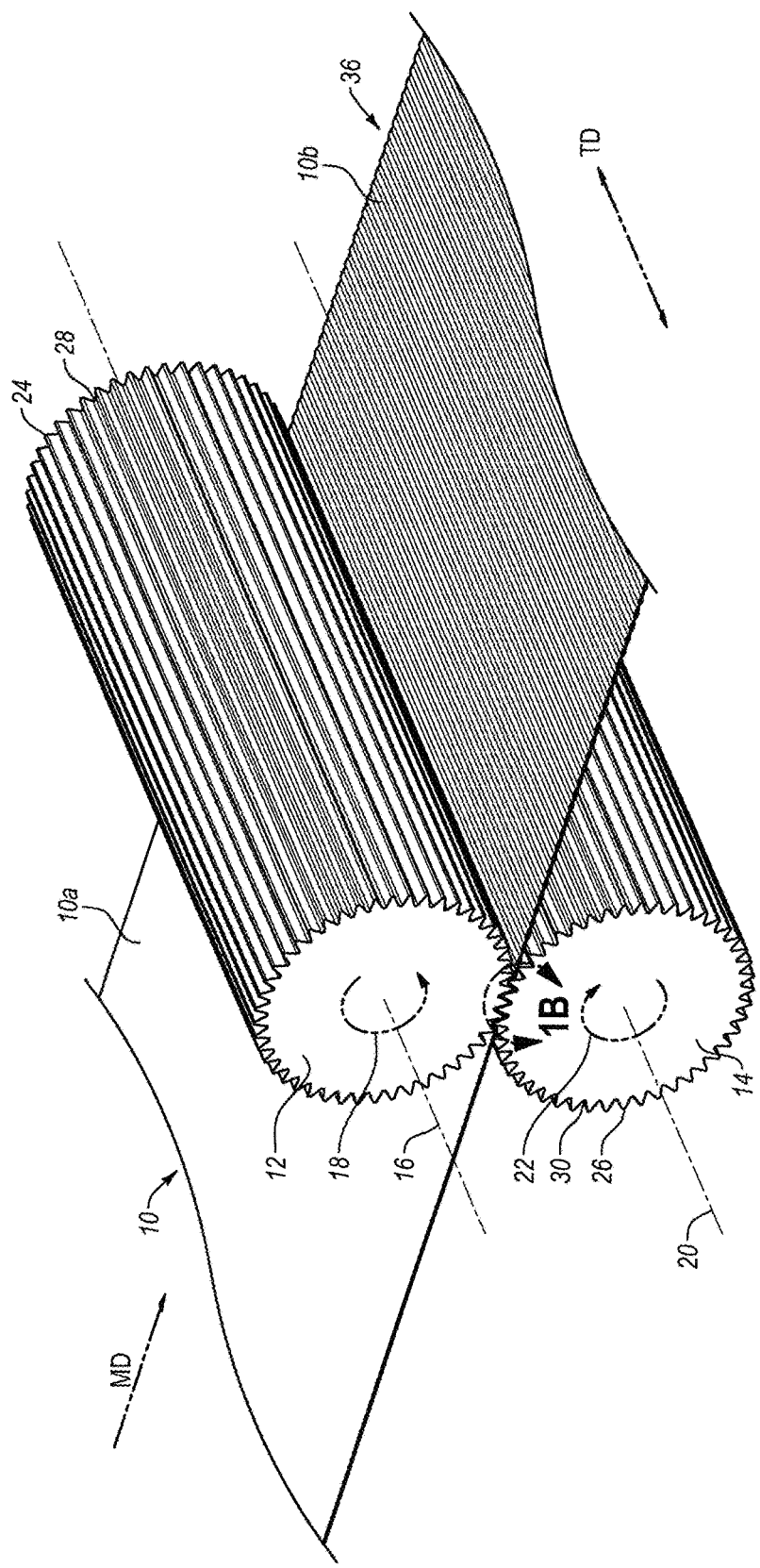
FIG. 1A illustrates a schematic diagram of a multi-layered film being lightly laminated by MD intermeshing rollers in accordance with one or more implementations of the present invention.

One or more implementations of the present invention include apparatus and methods for creating multi-layered lightly-laminated films with increased strength. In particular, one or more implementations provide for forming bonds between adjacent layers of a multi-layer film that are relatively light such that forces acting on the multi-layer film are first absorbed by breaking the bonds rather than or prior to tearing or otherwise causing the failure of the layers of the multi-layer film. Such implementations can provide an overall thinner film employing a reduced amount of raw material that nonetheless has maintained or increased strength parameters. Alternatively, such implementations can use a given amount of raw material and provide a film with increased strength parameters.

In particular, the light bonds or bond regions of adjacent layers of multi-layer films in accordance with one or more implementations can act to first absorb forces via breaking of the bonds prior to allowing that same force to cause failure of the individual layers of the multi-layer film. Such action can provide increased strength to the multi-layer film. In one or more implementations, the light bonds or bond regions include a bond strength that is advantageously less than a weakest tear resistance of each of the individual films so as to cause the bonds to fail prior to failing of the film layers. Indeed, one or more implementations include bonds that the release just prior to any localized tearing of the layers of the multi-layer film.

Thus, in one or more implementations, the light bonds or bond regions of a multi-layer film can fail before either of the individual layers undergo molecular-level deformation. For example, an applied strain can pull the light bonds or bond regions apart prior to any molecular-level deformation (stretching, tearing, puncturing, etc.) of the individual film layers. In other words, the light bonds or bond regions can provide less resistive force to an applied strain than molecular-level deformation of any of the layers of the multi-layer film. The inventors have surprisingly found that such a configuration of light bonding can provide increased strength properties to the multi-layer film as compared to a monolayer film of equal thickness or a multi-layer film in which the plurality of layers are tightly bonded together (e.g., coextruded).

One or more implementations of the present invention provide for tailoring the bonds or bond regions between layers of a multi-layer film to ensure light bonding and associated increased strength. For example, one or more implementations include modifying or tailoring one or more of a bond strength, bond density, bond pattern, or bond size between adjacent layers of a multi-layer film to deliver a film with strength characteristics better than or equal to the sum of the strength characteristics of the individual layers. Such bond tailoring can allow for multi-layer films at a lower basis weight (amount of raw material, grams per square meter) to perform the same as or better than higher basis weight mono-layer or coextruded films.

Relatively weak bonding of the two or more layers of the multi-layer film can be accomplished through one or more suitable techniques. For example, bonding may be achieved by pressure (for example MD ring rolling, TD ring rolling, stainable network lamination, or embossing), or with a combination of heat and pressure. Alternately, the film layers can be lightly laminated by ultrasonic bonding. Alternately, the films can be laminated by adhesives. Treatment with a Corona discharge can enhance any of the above methods. Prior to lamination, the separate layers can be flat film or can be subject to separate processes, such as stretching, slitting, coating and printing, and corona treatment.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present invention, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the film, fails.

The term laminate is also inclusive of coextruded multi-layer films comprising one or more tie layers. As a verb, "laminate" means to affix or adhere (by means of, for example, adhesive bonding, pressure bonding, ultrasonic bonding, corona lamination, and the like) two or more separately made film articles to one another so as to form a multi-layer structure. As a noun, "laminate" means a product produced by the affixing or adhering just described.

The individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, and combinations thereof. Adjacent sublayers of an individual layer may be coextruded. Coextrusion results in tight bonding so that the bond strength is greater than the tear resistance of the resulting laminate (i.e., rather than allowing adjacent layers to be peeled apart through breakage of the lamination bonds, the film will tear).

In one or more implementations, the light lamination or bonding between layers of a multi-layer film may be non-continuous (i.e., discontinuous or partial discontinuous). As used herein the terms "discontinuous bonding" or "discontinuous lamination" refers to lamination of two or more layers where the lamination is not continuous in the machine direction and not continuous in the transverse direction. More particularly, discontinuous lamination refers to lamination of two or more layers with repeating bonded patterns broken up by repeating un-bonded areas in both the machine direction and the transverse direction of the film.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "starting gauge" or "initial gauge" refers to the average distance between the major surfaces of a film before it is incrementally stretched so as to discontinuously bond adjacent layers together. Of course, it is also possible to stretch one or more of the individual layers before they are discontinuously bonded together.

Methods of providing relatively weak bonding of adjacent layers (i.e., so that the bond strength is less than a weakest tear resistance of the individual layers) can include many techniques, such as adhesive bonding, pressure bonding, ultrasonic bonding, and corona lamination. MD ring rolling, TD ring rolling, or other ring rolling processes (e.g., DD ring rolling or ring rolling that results in a thermoplastic film with strainable networks), and combinations thereof may be used to non-continuously bond adjacent layers of the multilayer film, as will be described in further detail below.

Film Materials

As an initial matter, one or more layers of the films (e.g., 10-10o of FIGS. 1A-9 and 17B) can comprise any flexible or pliable material comprising a thermoplastic material and that can be formed or drawn into a web or film. As described above, the film includes a plurality of layers of thermoplastic films. Each individual film layer may itself include a single layer or multiple layers. Adjuncts may also be included, as desired (e.g., pigments, slip agents, anti-block agents, tackifiers, or combinations thereof). The thermoplastic material of the films of one or more implementations can include, but are not limited to, thermoplastic polyolefins, including polyethylene, polypropylene, and copolymers thereof. Besides ethylene and propylene, exemplary copolymer olefins include, but are not limited to, ethylene vinylacetate (EVA), ethylene methyl acrylate (EMA) and ethylene acrylic acid (EAA), or blends of such olefins. Various other suitable olefins and polyolefins will be apparent to one of skill in the art.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber, and combinations thereof.

In at least one implementation of the present invention, the film can include linear low density polyethylene. The term "linear low density polyethylene" (LLDPE) as used herein is defined to mean a copolymer of ethylene and a minor amount of an alkene containing 4 to 10 carbon atoms, having a density of from about 0.910 to about 0.926 g/cm$^3$, and a melt index (MI) of from about 0.5 to about 10. For example, one or more implementations of the present invention can use an octene co-monomer, solution phase LLDPE (MI=1.1; ρ=0.920). Additionally, other implementations of the present invention can use a gas phase LLDPE, which is a hexene gas phase LLDPE formulated with slip/AB (MI=1.0; ρ=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

One will appreciate in light of the disclosure herein that manufacturers may form the individual films or webs to be non-continuously bonded together so as to provide improved strength characteristics using a wide variety of techniques. For example, a manufacturer can form a precursor mix of the thermoplastic material including any optional additives. The manufacturer can then form the film(s) from the precursor mix using conventional flat extrusion, cast extrusion, or coextrusion to produce monolayer, bilayer, or multilayered films. In any case, the resulting film will be discontinuously bonded to another film at a later stage to provide the benefits associated with the present invention.

Alternative to conventional flat extrusion or cast extrusion processes, a manufacturer can form the films using other suitable processes, such as, a blown film process to produce monolayer, bilayer, or multilayered films, which are subsequently discontinuously bonded with another film layer at a later stage. If desired for a given end use, the manufacturer can orient the films by trapped bubble, tenterframe, or other suitable processes. Additionally, the manufacturer can optionally anneal the films.

The extruder used can be of a conventional design using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present invention, can be a single screw type modified with a blown film die, an air ring, and continuous take off equipment.

In one or more implementations, a manufacturer can use multiple extruders to supply different melt streams, which a feed block can order into different channels of a multi-channel die. The multiple extruders can allow a manufacturer to form a multi-layered film with layers having different compositions. Such multi-layer film may later be non-continuously laminated with another layer of film to provide the benefits of the present invention.

In a blown film process, the die can be an upright cylinder with a circular opening. Rollers can pull molten plastic upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

Figure 1B:
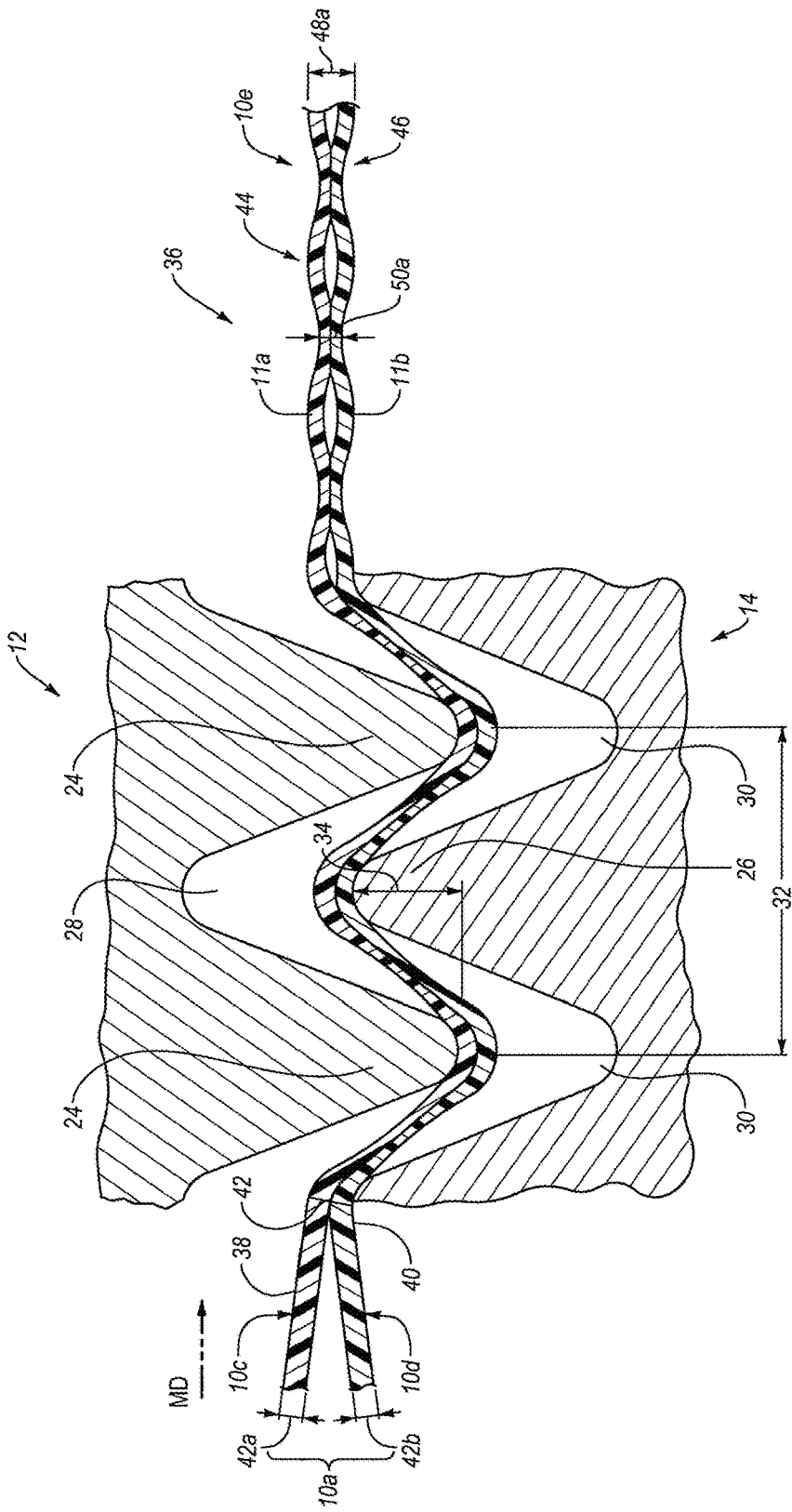
FIG. 1B illustrates an enlarged view of two initially separate thermoplastic films passing together through the intermeshing rollers of FIG. 1A taken along the circle 1B of FIG. 1 to form a multi-layered lightly-laminated.
Figure 1C:
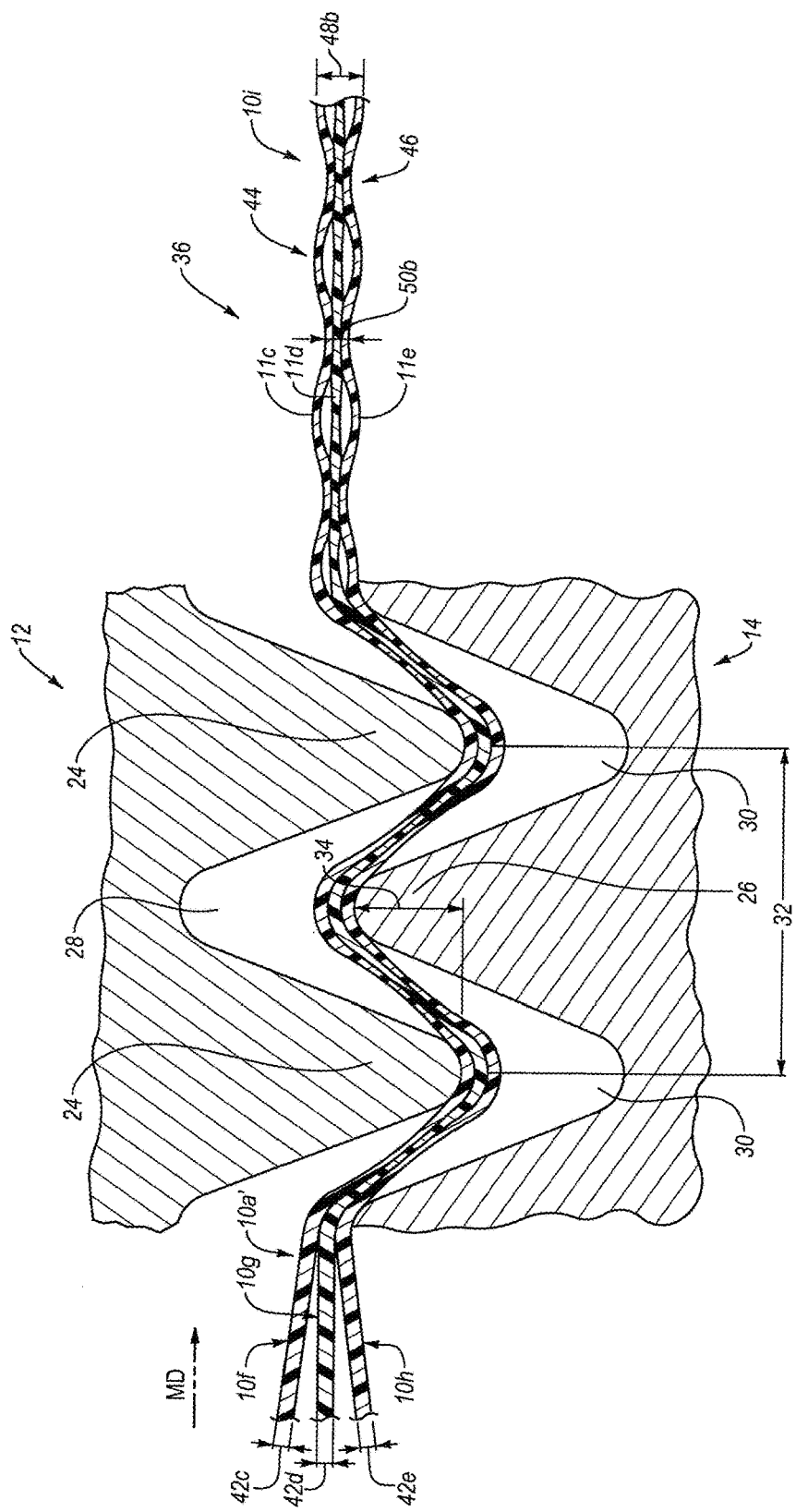
FIG. 1C illustrates an enlarged view of three initially separate thermoplastic films passing together through the intermeshing rollers of FIG. 1A to form a multi-layered lightly-laminated.

As previously mentioned, according to one implementation of the invention, the separate layers of the multi-layer film are non-continuously, lightly bonded to one another. FIGS. 1A-1C illustrate exemplary processes of partially discontinuously bonding adjacent layers of a multi-layer thermoplastic film in accordance with an implementation of the present invention. In particular, FIGS. 1A-1C illustrate an MD ring rolling process that partially discontinuously laminates the individual adjacent layers of thermoplastic multi-layered film 10 by passing the multi-layered film 10 through a pair of MD intermeshing rollers 12, 14. As a result of MD ring rolling, the multi-layered film 10 is also intermittently stretched in the machine direction MD.

As shown by the FIGS. 1A-1C, the first roller 12 and the second roller 14 can each have a generally cylindrical shape. The rollers 12, 14 may be made of cast and/or machined metal, such as, steel, aluminum, or any other suitable material. The rollers 12, 14 can rotate in opposite directions about parallel axes of rotation. For example, FIG. 1A illustrates that the first roller 12 can rotate about a first axis 16 of rotation in a counterclockwise direction 18. FIG. 1A also illustrates that the second roller 14 can rotate about a second axis 20 of rotation in a clockwise direction 22.

The intermeshing rollers 12, 14 can closely resemble fine pitch spur gears. In particular, the rollers 12, 14 can include a plurality of protruding ridges 24, 26. The ridges 24, 26 can extend along the rollers 12, 14 in a direction generally parallel to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIGS. 1B-1C. In alternative implementations, the tips of the ridges 24, 26 can have sharp angled corners. FIGS. 1A-1C also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the rollers 12, 14 intermesh. Similarly, the grooves 30 of the second roller 14 can receive the ridges 24 of the first roller 12.

One will appreciate in light of the disclosure herein that the configuration of the ridges 24, 26 and grooves 28, 30 can prevent contact between ridges 24, 26 during intermeshing so that no rotational torque is transmitted during operation. Additionally, the configuration of the ridges 24, 26 and grooves 28, 30 can affect the amount of stretching and the bond strength resulting from partially discontinuous lamination as the film passes through intermeshing rollers 12, 14.

Referring specifically to FIGS. 1B-1C, various features of the ridges 24, 26 and grooves 28, 30 are shown in greater detail. The pitch and depth of engagement of the ridges 24, 26 can determine, at least in part, the amount of incremental stretching and partially discontinuous lamination caused by the intermeshing rollers 12, 14. As shown by FIGS. 1B-1C, the pitch 32 is the distance between the tips of two adjacent ridges on the same roller. The "depth of engagement" ("DOE") 34 is the amount of overlap between ridges 24, 26 of the different rollers 12, 14 during intermeshing.

The ratio of DOE 34 to pitch 32 can determine, at least in part, the bond strength provided by the partially discontinuous bonding. According to one embodiment, the ratio of DOE to pitch provided by any ring rolling operation is less than about 1.5:1, suitably less than about 1.3:1, suitably between about 0.5:1 and about 1.2:1, or suitably between about 0.8:1 and about 1:1.

As shown by FIG. 1A, the direction of travel of the multi-layered film 10 through the intermeshing rollers 12, 14 is parallel to the machine direction and perpendicular to the transverse direction. As the thermoplastic multi-layered film 10 passes between the intermeshing rollers 12, 14, the ridges 24, 26 can incrementally stretch the multi-layered film 10 in the machine direction. In one or more implementations, stretching the multi-layered film 10 in the machine direction can reduce the gauge of the film and increase the length of the multi-layered film 10. In other implementations, the multi-layered film 10 may rebound after stretching such that the gauge of the multi-layered film 10 is not decreased. Furthermore, in one or more implementations, stretching the film 10 in the machine direction can reduce the width of the multi-layered film 10. For example, as the multi-layered film 10 is lengthened in the machine direction, the film's length can be reduced in the transverse direction.

In particular, as the multi-layered film 10 proceeds between the intermeshing rollers 12, 14, the ridges 24 of the first roller 12 can push the multi-layered film 10 into the grooves 30 of the second roller 14 and vice versa. The pulling of the multi-layered film 10 by the ridges 24, 26 can stretch the multi-layered film 10. The rollers 12, 14 may not stretch the multi-layered film 10 evenly along its length. Specifically, the rollers 12, 14 can stretch the portions of the film 10 between the ridges 24, 26 more than the portions of the multi-layered film 10 that contact the ridges 24, 26. Thus, the rollers 12, 14 can impart or form a generally striped pattern 36 into the multi-layered film 10. As used herein, the terms "impart" and "form" refer to the creation of a desired structure or geometry in a film upon stretching the film that will at least partially retain the desired structure or geometry when the film is no longer subject to any strains or externally applied forces.

FIGS. 1A-1C illustrate that the film 10a (i.e., the film that is yet to pass through the intermeshing rollers 12, 14) can have a substantially flat top surface 38 and substantially flat bottom surface 40. As seen in FIG. 1B, the multi-layer film 10a may comprise two layers 10c and 10d that are initially separate from one another. The film 10a can have an initial thickness or starting gauge 42 (i.e., the sum of 42a and 42b) extending between its major surfaces (i.e., the top surface 38 and the bottom surface 40). In at least one implementation, the starting gauge 42, as well as the gauge 42a, 42b of individual layers 10c and 10d can be substantially uniform along the length of the multi-layer film 10a. Because the inner surfaces of each layer 10c and 10d are somewhat tacky, the layers become lightly bonded together as they are pulled through and stretched by intermeshing rollers 12, 14. Those areas that are stretched become lightly bonded together.

In one or more implementations, the pre-laminated film 10a need not have an entirely flat top surface 38, but may be rough or uneven. Similarly, bottom surface 40 or the inner oriented surfaces of layers 10c and 10d of the film 10a can also be rough or uneven. Further, the starting gauge 42, 42a, and 42b need not be consistent or uniform throughout the entirety of pre-stretched film 10a. Thus, the starting gauge 42, 42a, and 42b can vary due to product design, manufacturing defects, tolerances, or other processing issues. According to one embodiment, the individual layers 10c and 10d may be pre-stretched (e.g., through MD ring rolling, TD ring rolling, etc.) before being positioned adjacent to the other layer (10d or 10c, respectively). Such pre-stretching of individual layers can result in a striped surface exhibiting an uneven top and bottom surface similar to that seen in FIG. 1A.

FIG. 1B illustrates that films 10a, can include two initially separate film layers 10c-10d. FIG. 1C illustrates an alternative implementation where film 10a' (and thus the incrementally stretched film 10i) can include three initially separate film layers: a middle film layer 10g, and two outer film layers 10f, 10h. In other embodiments, more than 3 layers may be provided (four, five, six, or more partially discontinuously or discontinuously laminated layers).

As seen in FIG. 1A, upon stretching and partially discontinuous lamination of the adjacent layers, the multi-layered lightly-laminated film 10b of FIG. 1A, 10e of FIG. 1B, or film 10i of FIG. 1C can include a striped pattern 36. The striped pattern 36 can include alternating series of un-bonded and un-stretched regions 44 adjacent to bonded and stretched regions 46. FIGS. 1B and 1C illustrate that the intermeshing rollers 12, 14 can incrementally stretch and partially discontinuously bond films 10a, 10a' to create multi-layered lightly-laminated multi-layer films 10b, 10e, 10i including bonded regions 46 and un-bonded regions 44.

For example, FIG. 1B illustrates that the film layers 11a, 11b of the multi-layered lightly-laminated film 10e can be laminated together at the stretched regions 46, while the un-stretched regions 44 may not be laminated together. Similarly, FIG. 1C illustrates that the film layers 11c, 11d, 11e of the multi-layered lightly-laminated 10i can be laminated together at the stretched regions 46, while the un-stretched regions 44 may not be laminated together.

In addition to any compositional differences between layers 10c, 10d, 10f, 10g, or 10h of a given multi-layer film, the different film layers can have differing gauges or thicknesses. In one or more implementations, the film layers may be substantially equal to one another in thickness. For example, the inventors have found that the MD or TD tear resistance of the composite, multi-layer film is typically approximately equal to the lowest MD or TD tear value of the individual layers, absent any increase in tear resistance provided by light bonding. In other words, the weakest layer often determines the strength of the multi-layer film structure.

As shown by FIGS. 1B and 1C the un-bonded regions 44 of the multi-layered lightly-laminated films 10e, 10i, can have a first average thickness or gauge 48a, 48b, respectively. The first average gauge 48a, 48b can be approximately equal to the combined starting gauges 42a-b, 42c-e of the starting films. In the Figures, separation between the unbonded layers at regions 44 is exaggerated for purposes of clarity. In one or more implementations, the first average gauge 48a, 48b can be less than the combined starting gauges 42a-42b, 42c-42e. The lightly bonded regions 46 can have a second average thickness or gauge 50a, 50b. In one or more implementations, the second average gauge 50a, 50b can be less than the combined starting gauges 42a-42b, 42c-42e and the first average gauge 48a, 48b, respectively.

In any event, FIGS. 1A-1C illustrate that intermeshing rollers 12, 14 can process the initially separately layered films into MD incrementally-stretched multi-layered lightly-laminated films. As previously mentioned, the MD incrementally-stretched multi-layered lightly-laminated films can include a striped pattern 36 where the bonding occurs along a continuous line or region along the width of the film 10b, parallel to the TD direction. The striped pattern 36 can include alternating series of un-bonded, un-stretched regions 44 and bonded, stretched regions 46. Although the un-stretched regions of the multi-layered lightly-laminated films may be stretched to a small degree by rollers 12,14 (or stretched in a separate operation), the un-stretched regions may be stretched significantly less compared to the bonded, stretched regions 46.

Figure 2:
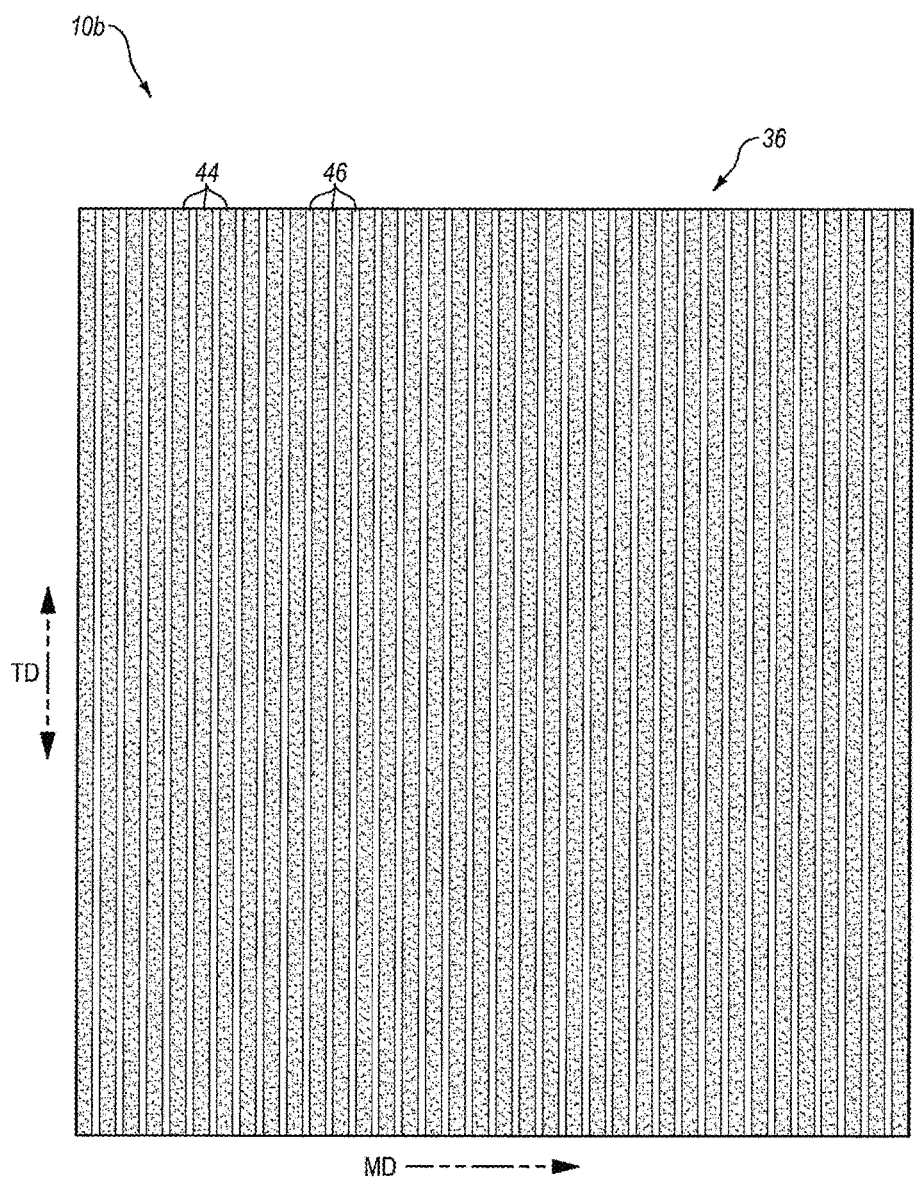
FIG. 2 illustrates a view of a multi-layered lightly-laminated thermoplastic film created by the intermeshing rollers of FIG. 1A.

FIG. 2 illustrates a top view of the MD incrementally-stretched multi-layered lightly-laminated film 10b with adjacent bonded and unbonded regions. As shown by FIG. 2, the film 10b includes bonded, stretched regions 46 adjacent to unbonded, un-stretched regions 44. In addition to resulting in partially discontinuous lamination of adjacent layers, MD ring rolling the film 10 can increase or otherwise modify one or more of the tensile strength, tear resistance, impact resistance, or elasticity of the film 10b, in addition to whatever additional strength is provided by the partially discontinuous, low strength bonds between adjacent layers of the film. Such bonds can be broken to absorb forces rather than such forces resulting in tearing of the film.

Furthermore, the bonded, stretched regions 46 can include bonded stripes that extend across the film 10b in a direction transverse (i.e., transverse direction) to a direction in which the film was extruded (i.e., machine direction). As shown by FIG. 2, the bonded stripes or stretched regions 46 can extend across the entire length of the film 10b. One will appreciate in light of the disclosure herein that the striped pattern 36 may vary depending on the method used to incrementally stretch and partially discontinuously bond adjacent layers of film 10. To the extent that MD or other ring rolling is used to lightly bond the film 10, the striped pattern 36 (e.g., width and spacing of the stripes or stretched regions 46) on the film 10 can depend on the pitch 32 of the ridges 24, 26, the DOE 34, and other factors. As regions 46 represent areas of the multi-layer film in which the adjacent layers are lightly bonded to one another, it will be apparent that altering the spacing and/or width of regions 46 can affect the overall strength of the film. For example, providing more bonded surface area relative to the unbonded surface area can increase the density of such bonds that can absorb forces, increasing the film strength.

FIG. 2 further illustrates that the bonded regions 46 can be intermittently dispersed about un-bonded regions 44. In particular, each bonded region 46 can reside between adjacent un-bonded regions 44. Additionally, the bonded regions 46 can be visually distinct from the un-bonded regions 44 as a result of stretching. The striped pattern 36 may vary depending on the method used to lightly laminate the film 10. In one or more implementations, the molecular structure of the thermoplastic material of the film multi-layered 10 may be rearranged during stretching (e.g., particularly so during cold stretching).

Figure 3:
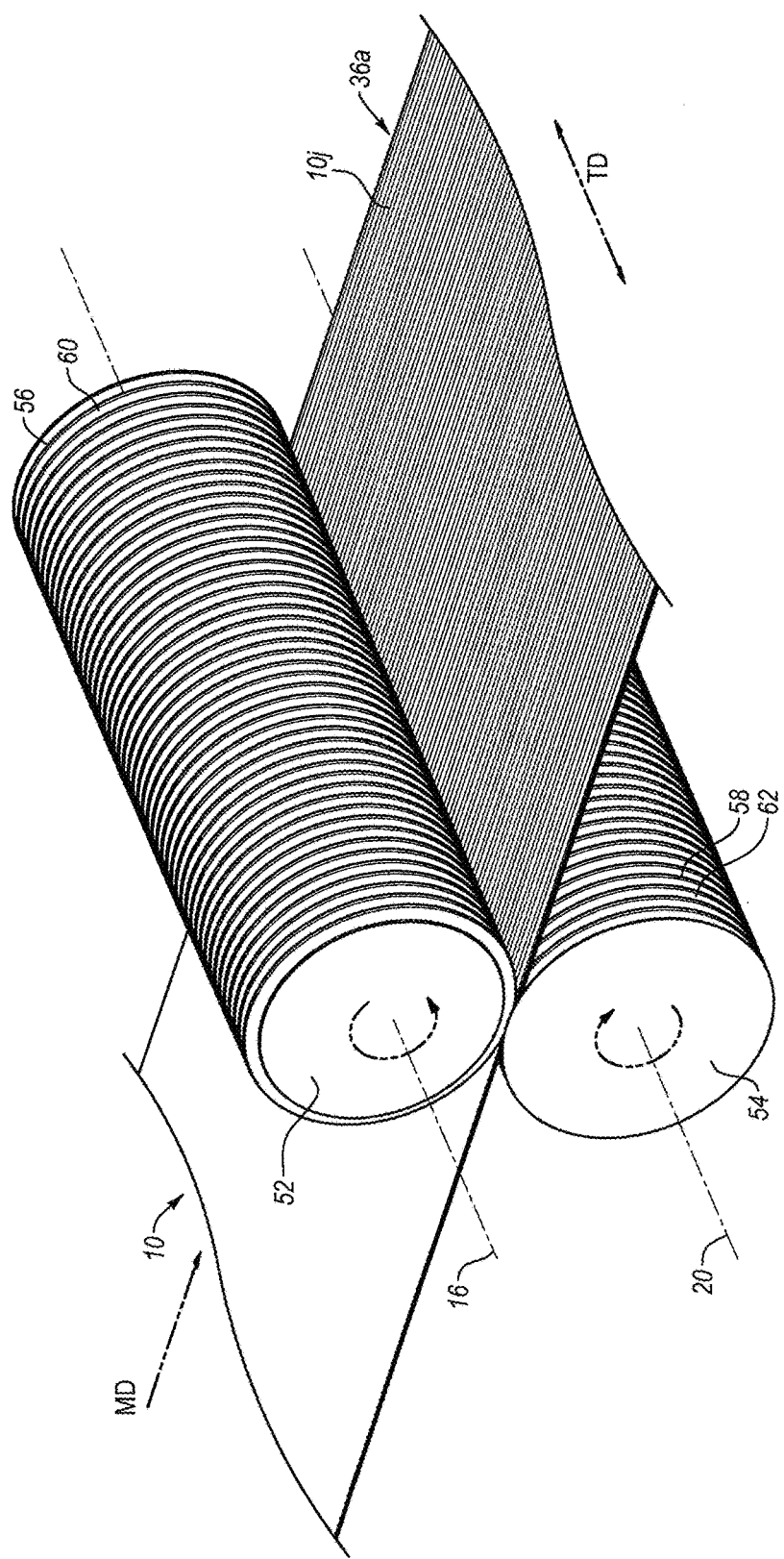
FIG. 3 illustrates a schematic diagram of a multi-layered thermoplastic film being lightly laminated by TD intermeshing rollers in accordance with one or more implementations of the present invention.

MD ring rolling is one exemplary method of partially discontinuously laminating a multi-layer film by incremental stretching of the film. TD ring rolling is another suitable method of discontinuously or partially discontinuously laminating a film. For example, FIG. 3 illustrates a TD ring rolling process that partially discontinuously and lightly bonds adjacent layers of a thermoplastic multi-layer film 10 by passing the film 10 through a pair of TD intermeshing rollers 52, 54.

A TD ring rolling process (and associated TD intermeshing rollers 52, 54) can be similar to the MD ring rolling process (and associated MD intermeshing rollers 12, 14) described herein above, except that the ridges 56, 58 and grooves 60, 62 of the TD intermeshing rollers 52, 54 extend generally orthogonally to the axes of rotation 16, 20 (i.e., parallel to the MD direction). Thus, as shown by FIG. 3, as the thermoplastic film 10 passes between the intermeshing rollers 52, 54, the ridges 56, 58 can incrementally stretch and lightly bond adjacent layers of the multi-layer film 10. The resultant multi-layered lightly-laminated film 10*j* can include a striped pattern 36*a* within the adjacent bonded and unbonded regions.

Figure 4:
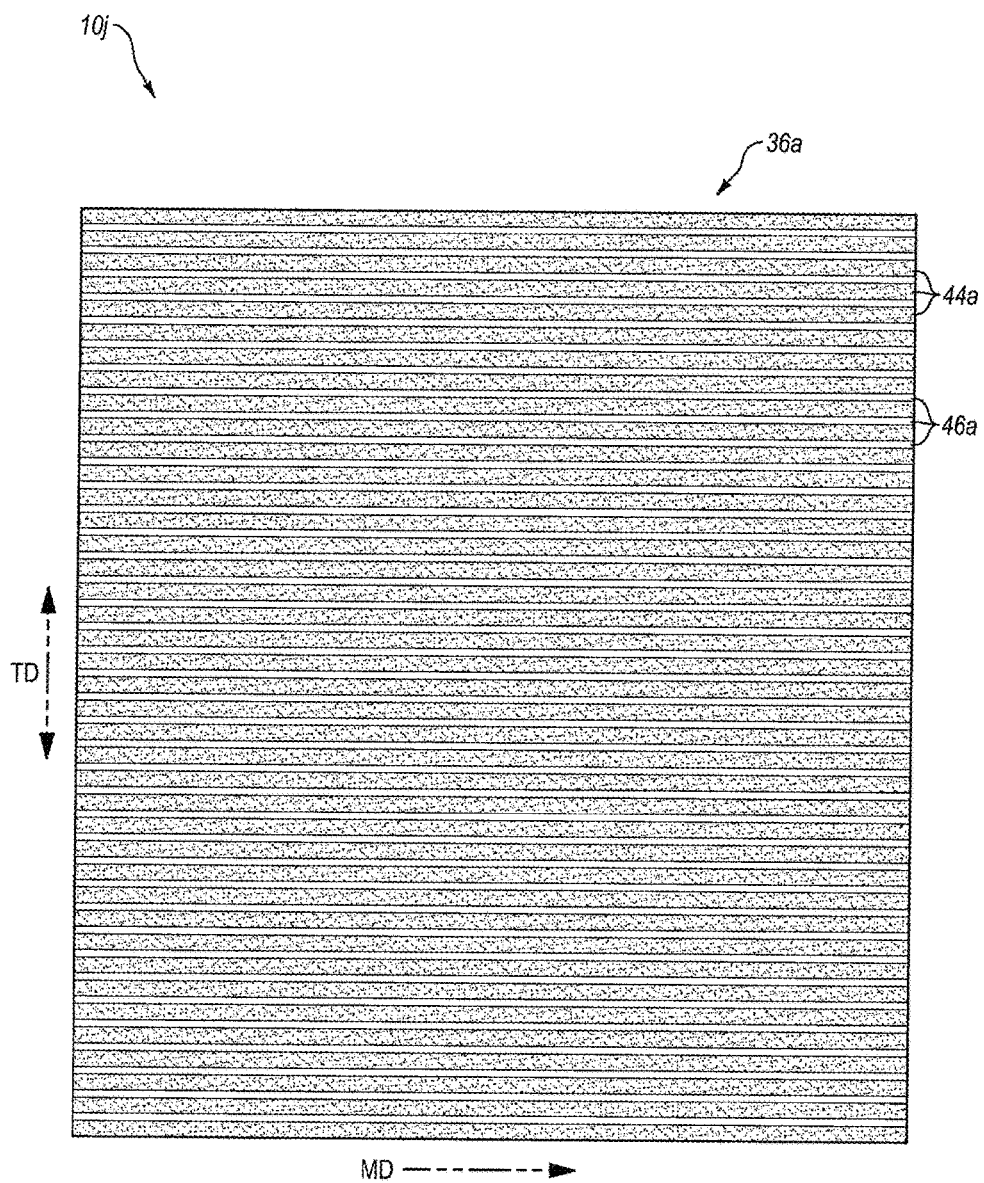
FIG. 4 illustrates a view of a multi-layered lightly-laminated thermoplastic film created by the intermeshing rollers of FIG. 3.

FIG. 4 illustrates a view of the TD incrementally-stretched multi-layered lightly-laminated film 10*j* with bonded regions 46*a* and adjacent un-bonded regions 44*a*. The striped pattern 36*a* can include alternating series of un-bonded regions 44*a* and bonded regions 46*a*. Similar to MD ring rolling, TD ring rolling the multi-layered film 10 can result in relatively light, partially discontinuous bonding of adjacent layers 10*c*, 10*d* (or 10*f*, 10*g*, 10*h*), increasing the strength of the multi-layer film 10*j*.

FIG. 4 illustrates that the bonded regions 46*a* can include stripes that extend across the multi-layered lightly-laminated film 10*j* in the machine direction. As shown by FIG. 4, the stripes or bonded regions 46*a* can extend across the entire width of the multi-layered lightly-laminated film 10*j*. In alternative implementations, bonded regions 46*a* can extend across only a portion of the multi-layered lightly-laminated film 10*j*. Similar to MD ring rolling, the pitch and the DOE of the ridges 56, 58 of the intermeshing rollers 52, 54 can affect the width and spacing of the stripes or bonded regions 46*a*, as well as the strength of the light bonds formed between adjacent layers, thereby affecting the overall increase in strength provided by the processing.

Figure 5:
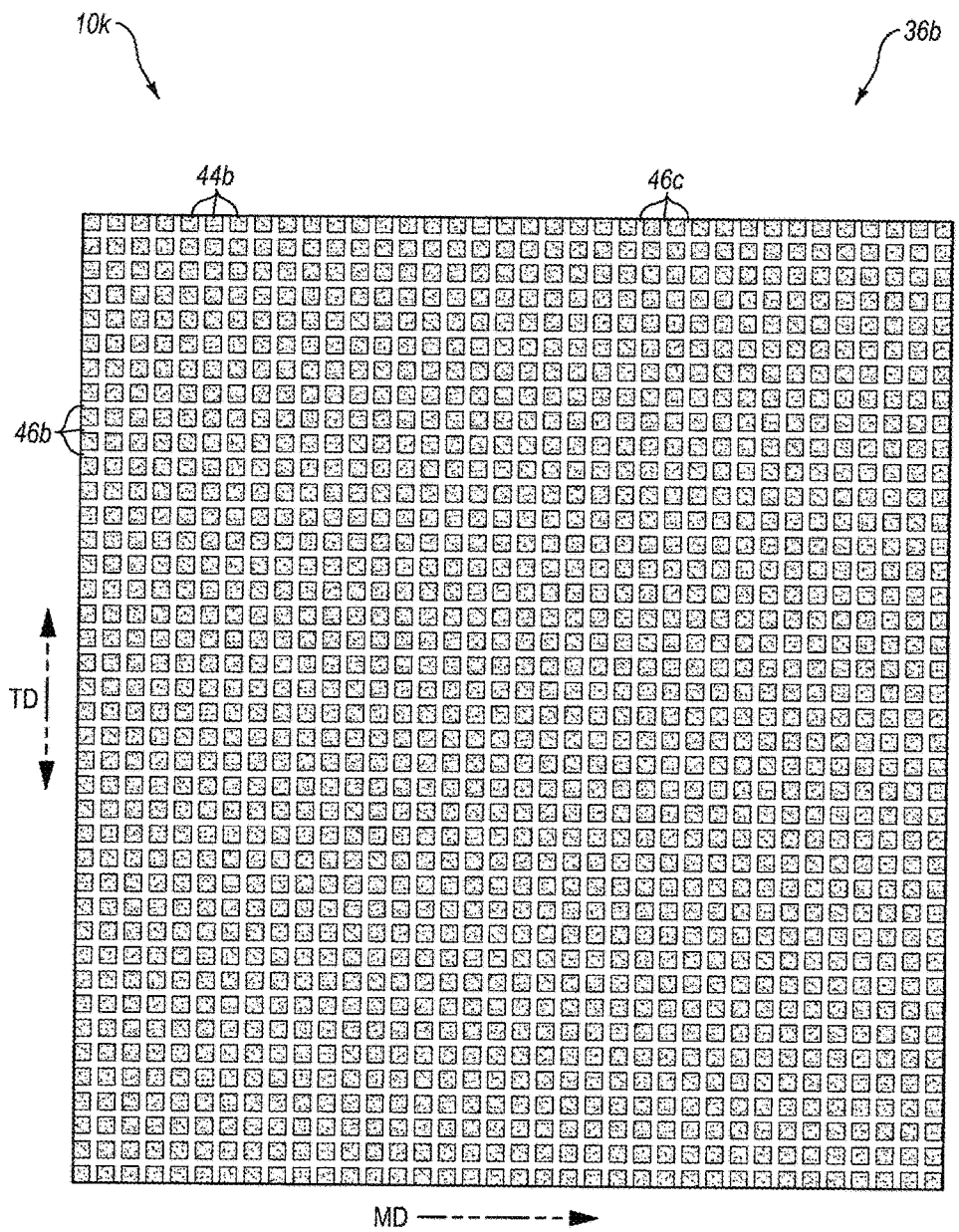
FIG. 5 illustrates a view of a multi-layered lightly-laminated thermoplastic film created by the intermeshing rollers of both FIG. 1A and FIG. 3.

In still further implementations, a multi-layered film 10 can undergo both an MD ring rolling process and a TD ring rolling process to lightly bond the individual layers together. For example, FIG. 5 illustrates a top view of a multi-layered lightly-laminated film 10*k* with bonded, stretched regions separated by un-bonded, un-stretched regions created by MD and TD ring rolling. The multi-layered lightly-laminated film 10*k* can have a grid pattern 36*b* including alternating series of un-bonded regions 44*b* and bonded regions 46*b*, 46*c*. In particular, un-bonded regions 44*b* may comprise a plurality of discrete squares or rectangles while the remainder of the surface comprises a grid of horizontal and vertical bonded regions that are connected together. The bonded regions 46*b*, 46*c* can include stripes 46*b* that extend along the multi-layered lightly-laminated film 10*k* in the machine direction, and stripes 46*c* that extend along the film in the transverse direction, which cross each other. As shown by FIG. 5, in one or more implementations, the aspect ratio of the rows and columns of the bonded regions 46*b*, 46*c* can be approximately 1 to 1. In alternative implementations, the aspect ratio of the rows and columns of bonded regions 46*b*, 46*c* can be greater or less than 1 to 1, for example, as explained in greater detail in relation to FIG. 13.

The multi-layered lightly-laminated film 10*k* with bonded regions and adjacent un-bonded regions created by MD and TD ring rolling can allow for greater material savings by further increasing the surface area of a given portion of film, by increasing the density of light lamination bonds within a given area, and may also provide properties or advantages not obtained by MD or TD ring rolling alone.

Figure 6:
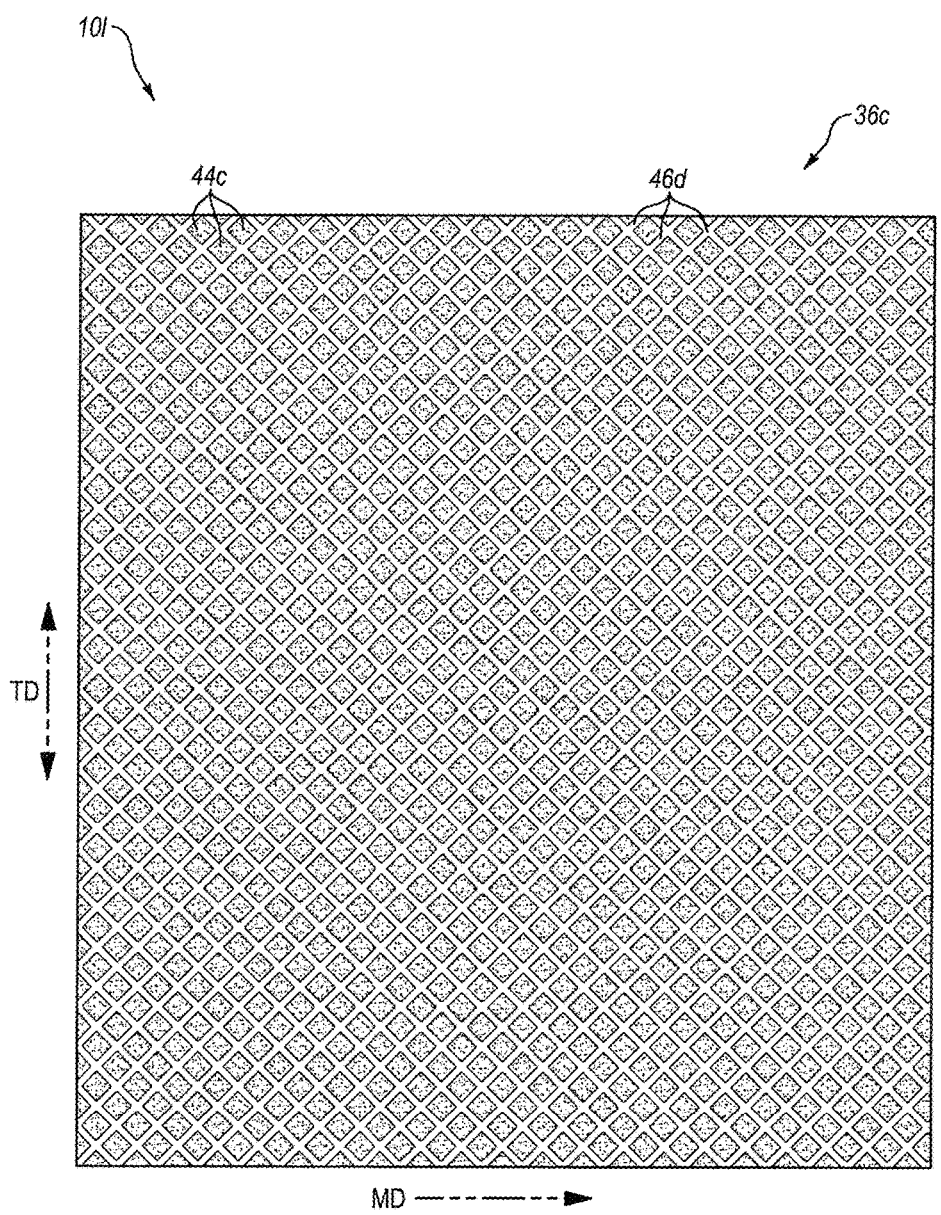
FIG. 6 illustrates a view of a multi-layered lightly-laminated thermoplastic film created by diagonal direction intermeshing rollers in accordance with one or more implementations of the present invention.

In yet further implementations, a manufacturer can use DD ring rolling to lightly bond a thermoplastic film. DD ring rolling processes (and associated DD intermeshing rollers) can be similar to the MD ring rolling process (and associated MD intermeshing rollers 12, 14) described herein above, except that the ridges and grooves of the DD intermeshing rollers can extend at an angle relative to the axes of rotation. For example, FIG. 6 illustrates a view of multi-layered lightly-laminated film 10*l* with bonded regions created by DD ring rolling. The multi-layered lightly-laminated film 10*l* can have a diamond pattern 36*c*. The diamond pattern 36*c* can include alternating series of diamond-shaped un-bonded regions 44*c* and bonded regions 46*d*. The bonded regions can include stripes 46*d* oriented at an angle relative to the transverse direction such that the stripes 46*d* are neither parallel to the transverse or machine direction. The illustrated configuration may be achieved with two ring rolling operations, similar to that of FIG. 5, but in which the DD ring rollers of each operation are angularly offset relative to one another (e.g., one providing an angle of about 45° off of MD ring rolling, the other providing an angle of about 45° off of TD ring rolling).

In accordance with another implementation, a structural elastic like film (SELF) process may be used to create a thermoplastic film with strainable networks, which similarly results in discontinuous bonding of adjacent layers within a multi-layer film. As explained in greater detail below, the strainable networks can include adjacent bonded and un-bonded regions. U.S. Pat. No. 5,518,801; U.S. Pat. No. 6,139,185; U.S. Pat. No. 6,150,647; U.S. Pat. No. 6,394,651; U.S. Pat. No. 6,394,652; U.S. Pat. No. 6,513,975; U.S. Pat. No. 6,695,476; U.S. Patent Application Publication No. 2004/0134923; and U.S. Patent Application Publication No. 2006/0093766 each disclose processes for forming strainable networks or patterns of strainable networks suitable for use with implementations of the present invention. The contents of each of the aforementioned patents and publications are incorporated in their entirety by reference herein.

Figure 7:
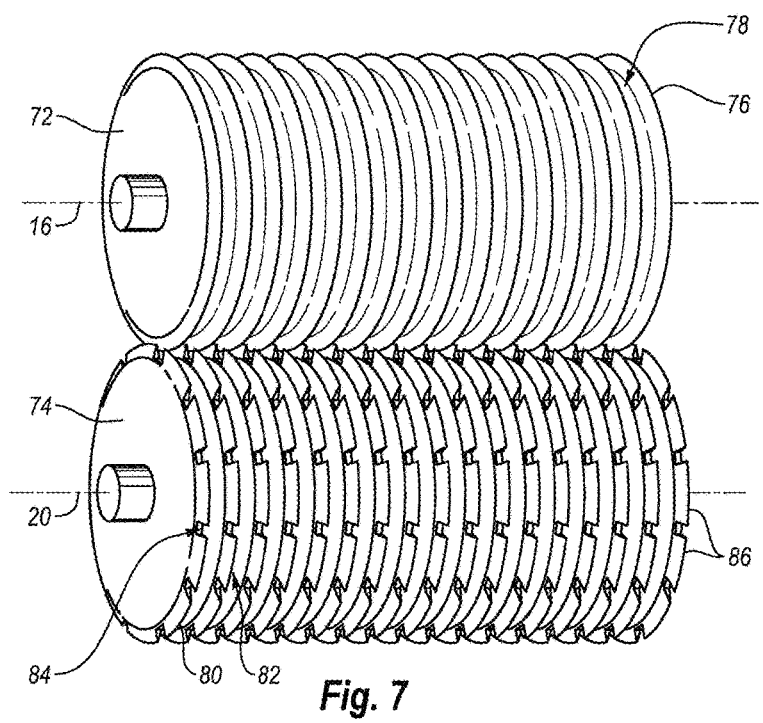
FIG. 7 illustrates a schematic diagram of a set of intermeshing rollers used to form a structural elastic like film (SELF) by imparting strainable networks into the film while lightly laminating adjacent layers of a film in accordance with one or more implementations of the present invention.

FIG. 7 illustrates a pair of SELF'ing intermeshing rollers 72, 74 for creating strainable networks with lightly bonded regions in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing roller 52, 54. The second SELF'ing intermeshing roller 74 can include also include a plurality of ridges 80 and grooves 82 extending generally radially outward in a direction orthogonal to an axis of rotation 20. As shown by FIG. 7, however, the ridges 80 of the second SELF'ing intermeshing roller 74 can include a plurality of notches 84 that define a plurality of spaced teeth 86.

Figure 8:
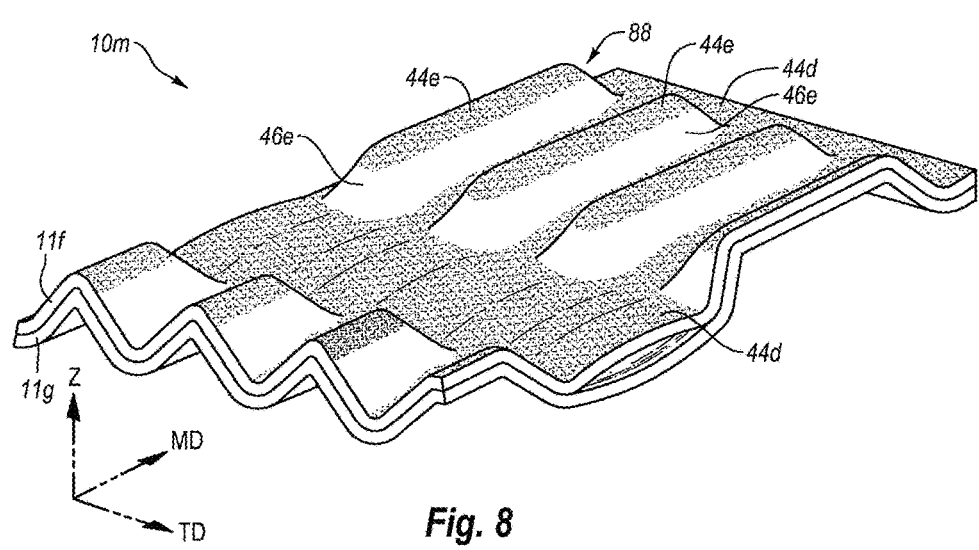
FIG. 8 illustrates a view of a multi-layered lightly-laminated thermoplastic film created by the intermeshing rollers of FIG. 7.

Referring now to FIG. 8, a multi-layered lightly-laminated film 10*m* with bonded regions dispersed about un-bonded regions created using the SELF'ing intermeshing rollers 72, 74 is shown. In particular, as the film passes through the SELF'ing intermeshing rollers 72, 74, the teeth 86 can press a portion of the multi-layer web or film out of plane to cause permanent deformation of a portion of the film in the Z-direction. The portions of the film that pass between the notched regions 84 of the teeth 86 will be substantially unformed in the Z-direction, resulting in a plurality of deformed, raised, rib-like elements 88. The length and width of rib-like elements 88 depends on the length and width of teeth 86.

As shown by FIG. 8, the strainable network of the multi-layered lightly-laminated film 10*m* can include first un-bonded regions 44*d*, second un-bonded regions 44*e*, and bonded transitional regions 46*e* connecting the first and second un-bonded regions 44*d*, 44*e*. The second un-bonded regions 44*e* and the bonded regions 46*e* can form the raised rib-like elements 88 of the strainable network. The bonded regions 46*e* can be discontinuous or separated as they extend across the multi-layered film 10*m* in both transverse and machine directions. This is in contrast to stripes that extend continuously across a film in one of the machine or transverse directions.

The rib-like elements 88 can allow the multi-layered lightly-laminated film 10*m* to undergo a substantially "geometric deformation" prior to a "molecular-level deformation." As used herein, the term "molecular-level deformation" refers to deformation which occurs on a molecular level and is not discernible to the normal naked eye. That is, even though one may be able to discern the effect of molecular-level deformation, e.g., elongation or tearing of the film, one is not able to discern the deformation which allows or causes it to happen. This is in contrast to the term "geometric deformation," which refers to deformations of multi-layered lightly-laminated film 10*m* which are generally discernible to the normal naked eye when the multi-layered film 10*m* or articles embodying the multi-layered lightly-laminated film 10*m* are subjected to an applied strain. Types of geometric deformation include, but are not limited to bending, unfolding, and rotating.

Thus, upon application of strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the multi-layered film 10*m*. Geometric deformation can result in significantly less resistive forces to an applied strain than that exhibited by molecular-level deformation.

In addition to improved properties thus provided by the ability to geometrically deform, the SELF'ing process also discontinuously and lightly laminates adjacent layers of the multi-layer film together, providing the benefits noted above. In particularly, the film layers 11*f*, 11*g* can be lightly laminated at stretched regions 46*e*, but un-bonded at the un-stretched regions 44*d* and 44*e*. The strength of the lamination bond is relatively weak, so as to be less than the weakest tear resistance of the individual layers of the multi-layer film. Thus, the lamination bond is broken rather than the individual layer tearing upon application of a force. Typically, tearing in the MD direction requires less applied force than tearing in the TD direction, thus in one embodiment, the lamination bond strength is less than the MD tear resistance of each individual layer of the multi-layer film.

Figure 9:
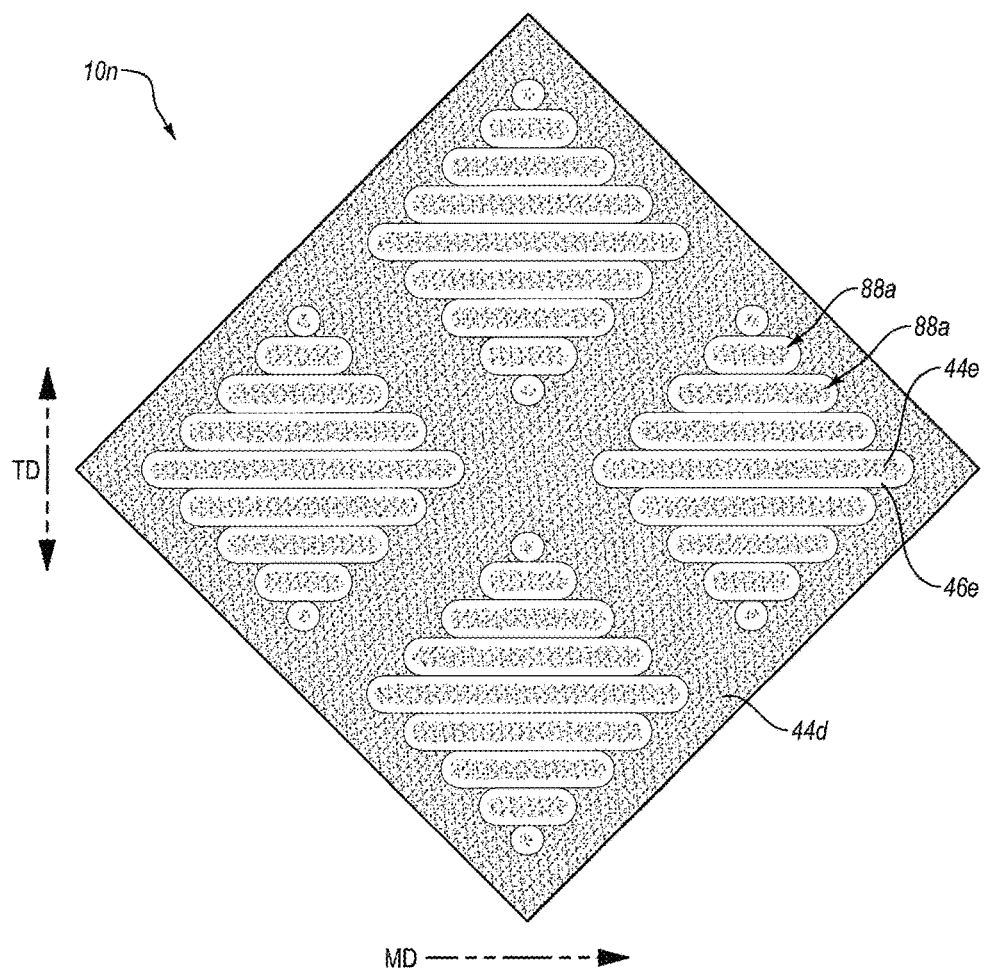
FIG. 9 illustrates a view of another multi-layered lightly-laminated thermoplastic film including strainable networks in accordance with one or more implementations of the present invention.

FIG. 9 illustrates a multi-layered lightly-laminated film 10*n* with a strainable network of rib-like elements 88*a* arranged in diamond patterns. The strainable network of the multi-layered lightly-laminated film 10*n* can include first un-bonded regions 44*d*, second un-bonded regions 44*e*, and bonded transitional regions 46*e* connecting the first and second un-bonded regions 44*d*, 44*e*.

One or more implementations of the present invention can include strainable network patterns other than those shown by FIGS. 8 and 9, or combinations of various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or neither the machine or transverse directions.

Figure 10A:
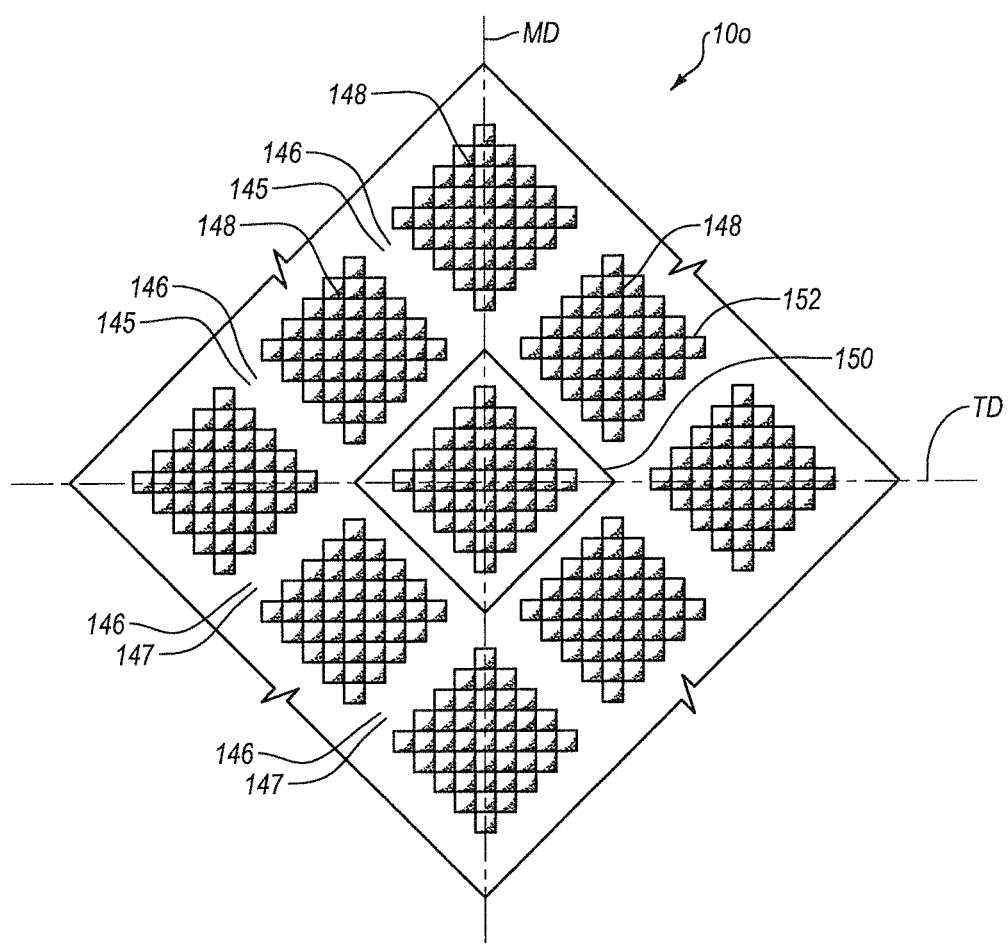
FIG. 10A illustrates a view of yet another multi-layered lightly-laminated thermoplastic film including strainable networks in accordance with one or more implementations of the present invention.
Figure 10B:
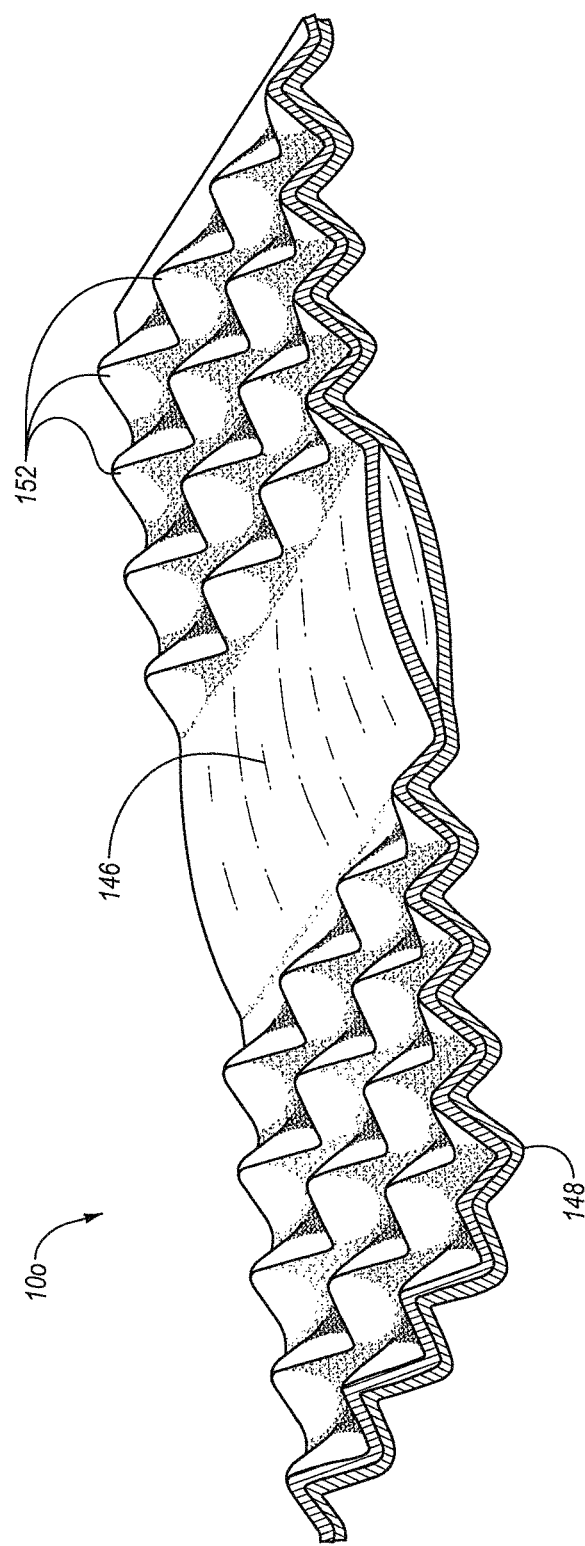
FIG. 10B illustrates a cut away perspective view across and through the block pattern of FIG. 10A.

For example, FIGS. 10A and 10B show a multi-layered lightly-laminated film 10*o* where the film layers have undergone a film stretching process in which a discontinuous laminate material is formed with a strainable network of distinct regions. The strainable network laminate includes a plurality of un-bonded areas 146 that define a first region and a plurality of bonded areas 148 that define a second region. Portions of the un-bonded areas 146, indicated generally as 147, extend in a first direction and may be substantially linear. Remaining portions of the unbonded areas 146, indicated generally as 145, extend in a second direction that is substantially perpendicular to the first direction, and the remaining portions 145 of the unbonded areas 146 may be substantially linear. While it may be preferred that the first direction be perpendicular to the second direction, other angular relationships between the first direction and the second direction may be suitable. The angles between the first and second directions may range from about 45° to about 135°, with 90° being the most preferred. Intersecting sections of the portions 147 and 145 of the unbonded areas 146 form boundaries 150 (only one shown in FIG. 10A), which completely surround the bonded areas 148. It should be understood that the boundaries 150 are not limited to the square shape illustrated herein and that boundaries 150 may comprise other shapes as required by the particular configuration of the un-bonded and bonded areas 146, 148, respectively.

The multi-layered lightly-laminated multi-layer film 10*o* shown in FIG. 10A-10B comprises a multi-directional strainable network laminate providing stretch characteristics in multiple directions of strain, similar to that shown in FIG. 8. A first region comprises un-bonded areas 146 generally illustrated as bands of unformed material generally lying in a plane defined by the discontinuous laminate material 10*o*. A second region comprises bonded areas 148 generally defined by nub-like patterns 152 (see FIG. 10B) extending out of the plane of the discontinuous laminate material 10*o* and comprised of a pattern extending in first and second distinct directions as formed by first and second superimposed patterns, where the patterns are illustrated as being substantially similar to each other.

FIGS. 11A-11B illustrate an embossing type roll configuration for lightly bonding layers together by forming a multi-directional strainable network laminate in a single pass through a set of intermeshing rollers including a punch roll 153 and a cooperating die roll 154, where the punch roll is provided with punch regions 156 and the die roll is provided with corresponding die regions 158 for cooperating with the punch regions 156. The punch regions 156 may each be provided with a plurality of punch elements 160 for cooperating with corresponding die elements 162 in the die regions 158. Cooperating engagement of the punch elements 160 with the die elements 162, with a sheet material therebetween, forms a bonded pattern on the material. Alternatively, the cooperating die roll 154 may comprise a conformable surface for conforming to the punch elements 160, or other surface configuration of the punch roll 153.

Referring to FIG. 11C, a pattern formed by the rolls 153, 154 is illustrated in which each of the bonded areas 148 of the multi-directional strainable network laminate is formed by a cooperating set of punch and die elements 160, 162, such as is illustrated in the enlarged surface views of FIG. 22B, and the remaining unformed areas define the unbonded areas 146 of the multi-layered lightly-laminated film including multi-directional strainable networks.

One will appreciate in light of the disclosure herein that using ring rolling and/or SELFing to form the light bonds can provide the additional benefit of stretching the film layers, thereby reducing the basis weight of the multi-layered lightly-laminated film. Thus, using incremental-stretching to form the light bonds can allow for multi-layer films at a lower basis weight (amount of raw material) to perform the same as or better than higher basis weight mono-layer or co-extruded films.

In addition to ring rolling and SELFing, one or more implementations include using embossing, stamping, adhesive lamination, ultrasonic bonding, thermal, pressure, or other methods of lightly laminating layers of a multilayer film. In such implementations, one or more of the layers of the multi-layered lightly-laminated film can be stretched to reduce the basis weight and/or modify the strength parameters of the film prior to lamination. Stretching of the individual layers can include incrementally-stretching (e.g., ring rolling, SELFing) or continuous stretching (e.g., MDO).

One will appreciate in light of the disclosure herein that the lightly bonded multi-layered films can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include lightly bonded multi-layer films to one extent or another. Trash bags and food storage bags may be particularly benefited by the films and methods of the present invention.

Figure 12A:
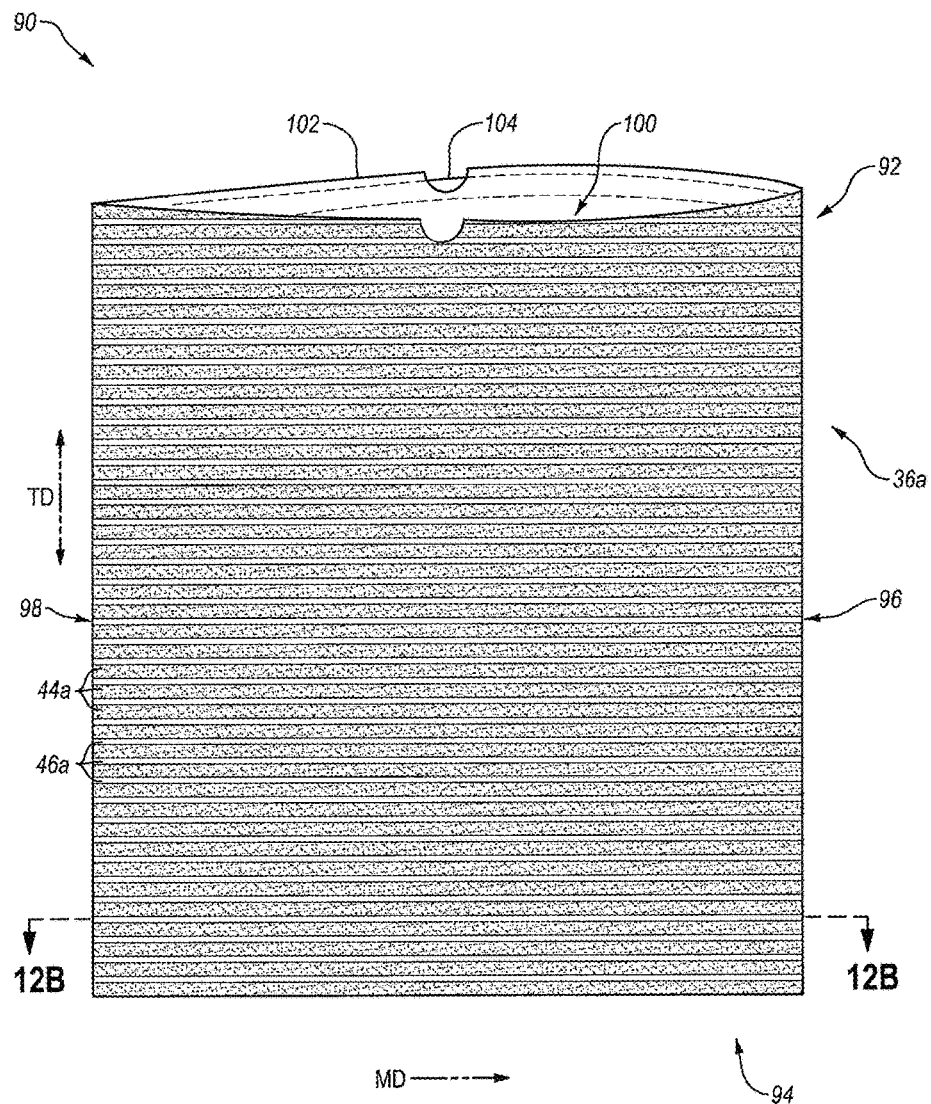
FIG. 12A illustrates a bag incorporating the multi-layered lightly-laminated film of FIG. 4.
Figure 12B:
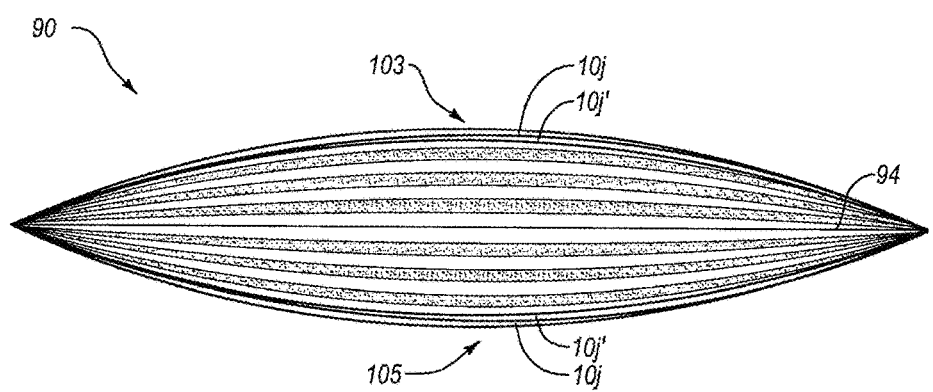
FIG. 12B illustrates a cross-sectional view of the bag of FIG. 12A taken along the line 12B-12B of FIG. 12A.

Referring to FIGS. 12A and 12B, the multi-layer film 10j illustrated in FIG. 4 is incorporated in a flexible draw tape bag 90. The bag 90 can include a bag body 92 formed from a piece of incrementally-stretched adhesively-laminated film 10h folded upon itself along a bag bottom 94. Side seams 96 and 98 can bond the sides of the bag body 92 together to form a semi-enclosed container having an opening 100 along an upper edge 102. The bag 90 also optionally includes closure means 104 located adjacent to the upper edge 102 for sealing the top of the bag 90 to form a fully-enclosed container or vessel. The bag 90 is suitable for containing and protecting a wide variety of materials and/or objects. The closure means 104 can comprise flaps, adhesive tapes, a tuck and fold closure, an interlocking closure, a slider closure, a zipper closure or other closure structures known to those skilled in the art for closing a bag.

As shown, the sides of the bag body 92 can include un-stretched regions 44a and stretched regions 46a in the form of stripes. The stripes can extend across the multi-layered bag 90 in the MD direction, or in other words, from the first side seam 96 to the second side seam 98. The multi-layered bag 90 can require less material to form than an identical bag formed with film 10a (not discontinuously laminated) of the same thermoplastic material. Additionally, despite requiring less material, the multi-layered bag 90 includes improved strength properties imparted by lightly bonding adjacent layers of the multi-layer film together.

Furthermore, as shown by FIGS. 12A and 12B, a bag 90 formed from a multi-layered lightly-laminated film can have a first layer of thermoplastic material (i.e., film 10j). The first layer (i.e., film 10j) can include first and second side walls joined along a bottom edge, a first side edge, and an opposing second side edge. In particular, the bottom edge of the first layer (i.e., film 10j) can comprise a fold. The bag 90 can also include a second layer of thermoplastic material (i.e., film 10j'). The second layer (i.e., film 10j') can include including first and second side walls joined along a bottom edge, a first side edge, and an opposing second side edge.

As shown by FIG. 12B, the second layer (i.e., film 10j') is positioned within the first layer (i.e., film 10j). Furthermore, the first layer (i.e., film 10j) and the second layer (i.e., film 10j') are light bonded to each other. Furthermore, in the implementation shown in FIGS. 12A and 12B, both the first layer (i.e., film 10j) and the second layer (i.e., film 10j') are incrementally stretched.

Figure 13:
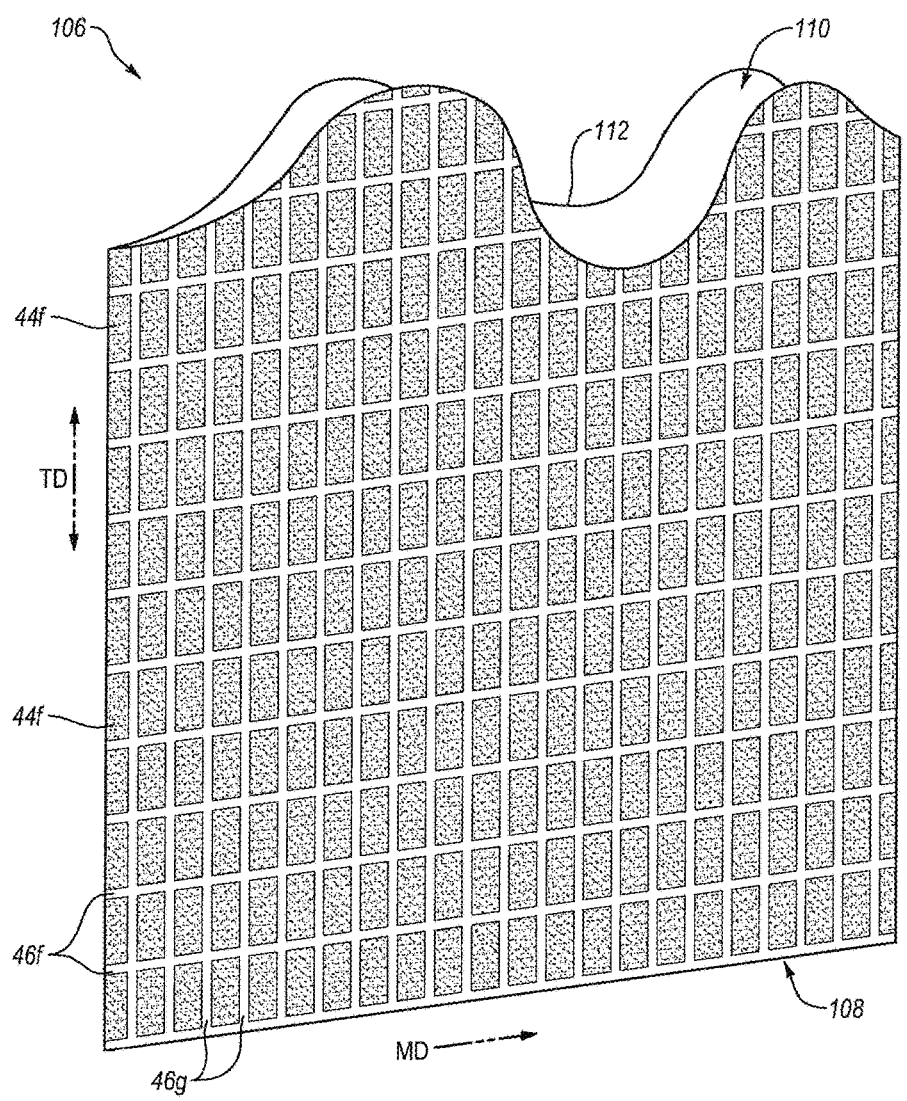
FIG. 13 illustrates a bag incorporating a multi-layered lightly-laminated film in accordance with one or more implementations of the present invention.

FIG. 13 illustrates a multi-layered tie bag 106 incorporating a multi-layered lightly-laminated film in accordance with an implementation of the present invention. As shown, the sides of the tie bag 106 can include a pattern of un-bonded, regions 44f and bonded regions 46f, 46g created by MD and TD ring rolling.

The lightly bonded regions can include stripes 46f that extend across the bag 106 in the machine direction. Additionally, the bonded regions can include stripes 46g that extend across the bag 106 in the transverse direction, or in other words from the bag bottom 108 to flaps 110 of an upper edge 112 of the multi-layered bag 106. Bonded regions 46f and 46g are characterized by relatively light bonding of adjacent layers of the multi-layer film, which acts to absorb forces into breaking of the lamination bond rather than allowing that same force to cause tearing of either of the layers of the multi-layer film. Such action provides significantly increased strength to the multi-layer film as compared to a monolayer similar thickness film or compared to a multi-layer film of similar thickness where the layers are strongly bonded together (i.e., at a bond strength at least as great as the tear resistance of the weakest layer). The lamination bond includes a bond strength that is advantageously less than the tear resistance of each of the individual films so as to cause the lamination bond to fail prior to tearing of the film layers.

In comparison with the film 10k of FIG. 5, the spacing between the MD extending stripes 46f is greater in the multi-layered bag 106. This effect is created by using MD ring rolls having a greater pitch between ridges. Similarly, the spacing of the TD extending stripes 46g is greater in the multi-layered bag 106 than the multi-layered film 10m. This effect is created by using TD ring rolls having a greater pitch between ridges. Furthermore, the relative spacing between the MD extending stripes and the TD extending stripes differs in the multi-layered bag 106, while relative spacing is the same in the multi-layered film 10k. This effect is created by using TD ring rolls having a greater pitch between ridges compared to the pitch between ridges of the MD ring rolls.

One will appreciate in light of the disclosure herein that the use of intermeshing rollers with greater or varied ridge pitch can provide the different spacing and thicknesses of the stripes. Thus, a manufacturer can vary the ridge pitch of the intermeshing rollers to vary the pattern of the multi-layer film. The bond density (i.e., the fraction of surface area that is bonded relative to unbonded) and particular pattern provided not only affects the aesthetic appearance of the bag or film, but may also affect the strength characteristics provided. For example, higher bond density may provide increased strength as it provides a greater number of relatively low strength lamination bonds that may be broken so as to absorb forces, preventing such forces from leading to tearing of the bag or film. Film 10k of FIG. 5 has a higher bond density than the film of the bag 106 of FIG. 13.

By way of further example, where the MD tear resistance is lower than TD tear resistance for the particular films employed, it may be advantageous to provide a higher density of bonds in the MD than the TD direction. This may provide greater improvement to MD tear resistance of the multi-layered lightly-laminated film as compared to TD tear resistance improvement. A similar configuration could be provided for films in which the TD tear resistance were lower than MD tear resistance by increasing bond density in the TD direction.

Figure 14:
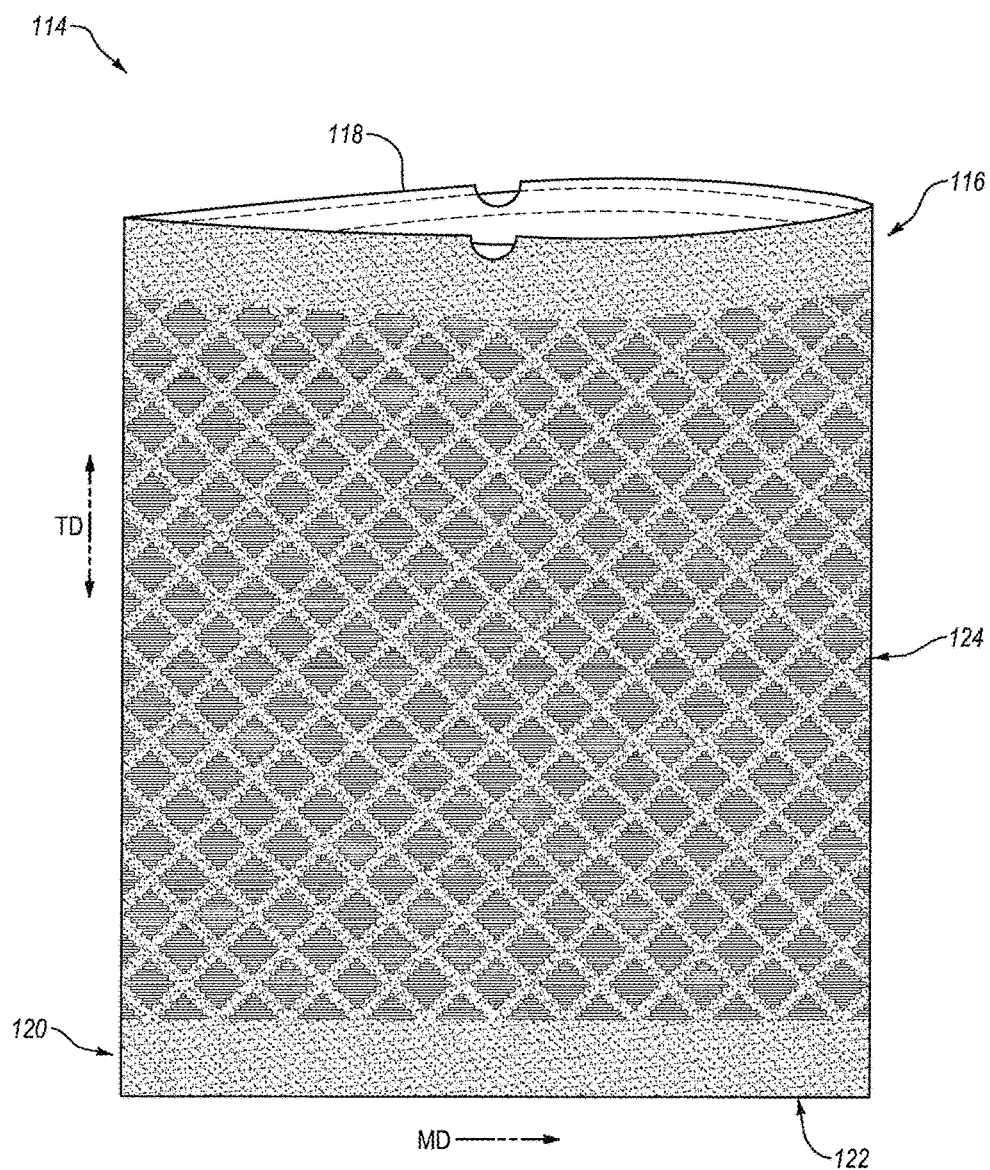
FIG. 14 illustrates a bag incorporating a middle section having lightly bonded regions in accordance with one or more implementations of the present invention.

In addition to varying the pattern of bonded and un-bonded regions in a bag or film, one or more implementations also include providing lightly bonded regions in certain sections of a bag or film, and only un-bonded (or alternatively tightly bonded) regions in other sections of the bag or film. For example, FIG. 14 illustrates a multi-layered bag 114 having an upper section 116 adjacent a top edge 118 that is devoid of bonded regions. Similarly, the multi-layered bag 114 includes a bottom section 120 adjacent a bottom fold or edge 122 devoid of bonded regions. In other words, both the top section 116 and bottom section 120 of the multi-layered bag 114 can each consist only of un-bonded regions. Alternatively, the layers of sections 116 and 120 may be tightly bonded together (e.g., co-extruded). In any case, sections 116 and 120 may be void of bonds.

A middle section 124 of the multi-layered bag 114 between the upper and lower sections 116, 120 on the other hand can include lightly bonded regions interspersed with un-bonded regions. In particular, FIG. 14 illustrates that the middle section can include a strainable network of rib-like elements arranged in diamond patterns similar to the multi-layered lightly-laminated film 10n of FIG. 9. Thus, the middle section 124 of the multi-layered bag 114 can include improved strength created by the light bonds of the strainable network.

Figure 15:
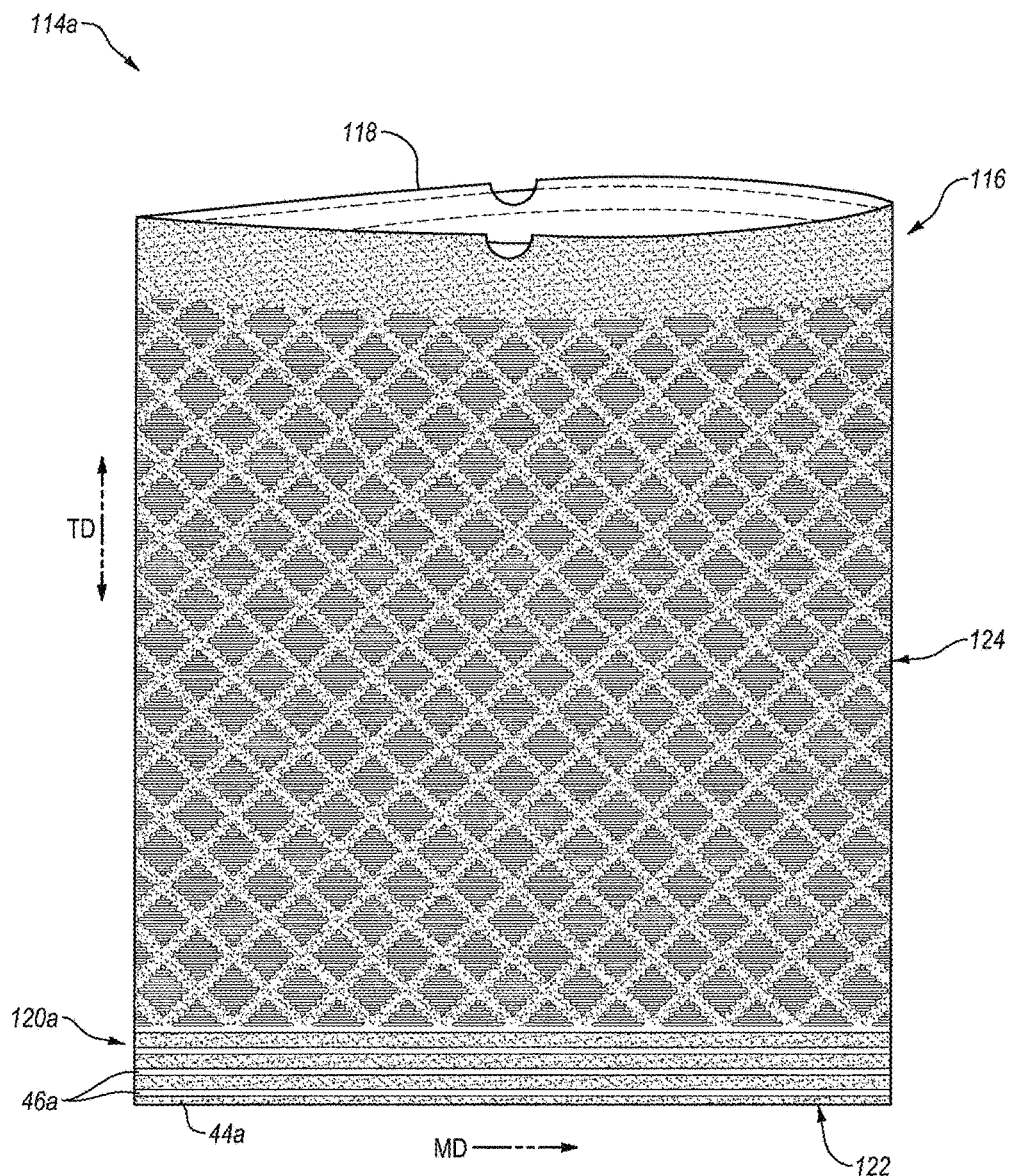
FIG. 15 illustrates a bag incorporating sections of different patterns of lightly bonded regions in accordance with one or more implementations of the present invention.

In one or more additional implementations, the present invention includes providing different lightly bonded regions in different sections of a bag or film. For example, FIG. 15 illustrates a multi-layered bag 114a similar to the multi-layered bag 114 of FIG. 14, except that the bottom section 120a includes alternating series of un-bonded regions 44a and bonded regions 46a created by TD ring rolling. Thus, the middle section 124 of the bag 114 can include properties of increased strength as a result of light discontinuous lamination and increased elasticity through geometric deformation, while the bottom section includes increased strength as a result of light partially discontinuous lamination by TD ring rolling.

Figure 16:
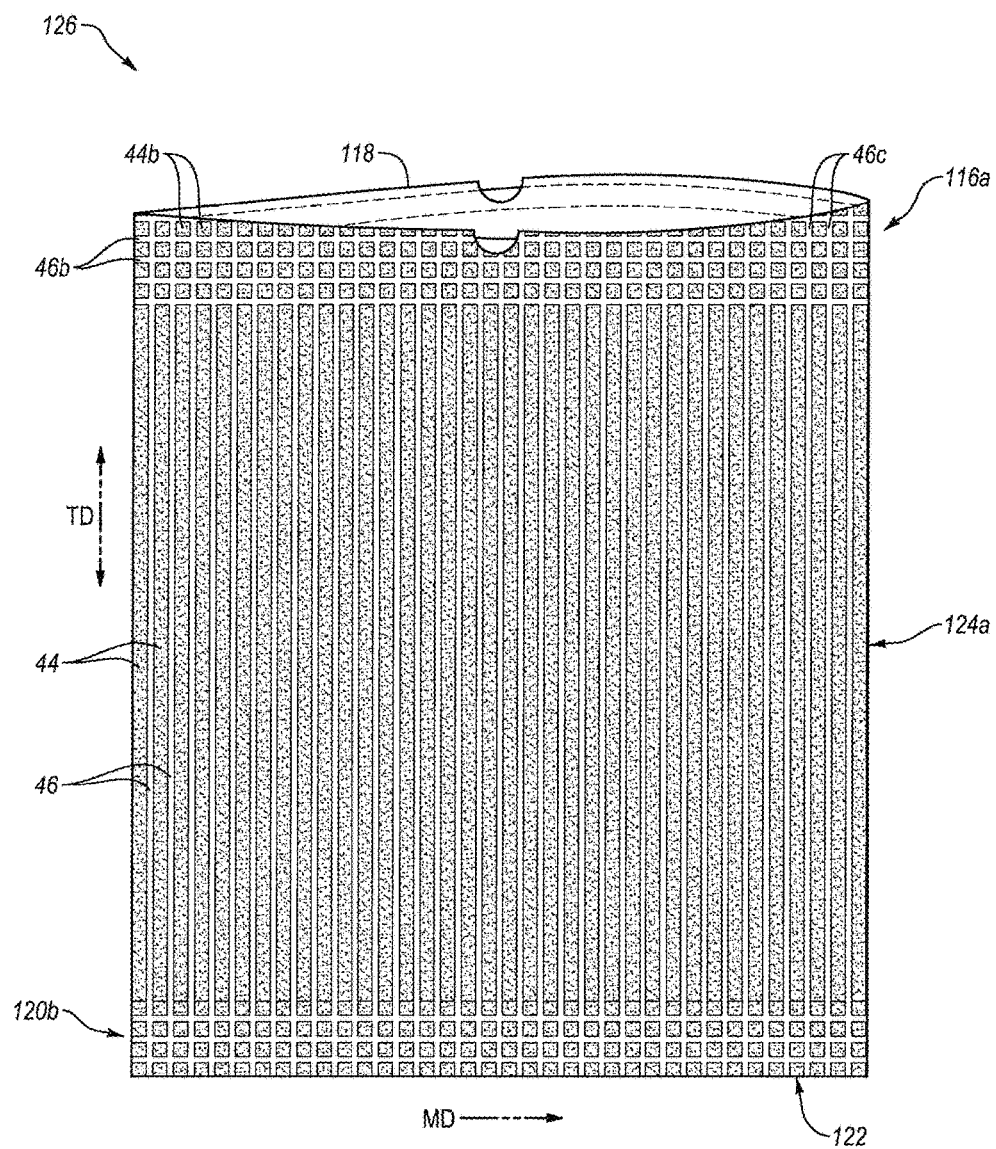
FIG. 16 illustrates another bag incorporating sections of different patterns of lightly bonded regions in accordance with one or more implementations of the present invention.

FIG. 16 illustrates yet another multi-layered bag 126 including an upper section 116a adjacent a top edge 118 that includes alternating series of un-bonded regions 44b and bonded regions 46b, 46c created by MD and TD ring rolling similar to the film 10k of FIG. 5. Furthermore, the middle section 124a of the multi-layered bag 126 can include un-bonded regions 44 and bonded regions 46 in the form of stripes created by MD ring rolling.

Thus, one will appreciate in light of the disclosure herein that a manufacturer can tailor specific sections or zones of a bag or film with desirable properties by MD, TD, DD ring rolling, SELF'ing, or combinations thereof. One will appreciate in light of the disclosure herein that one or more implementations can include bonded regions arranged in other patterns/shapes. Such additional patterns include, but are not limited to, intermeshing circles, squares, diamonds, hexagons, or other polygons and shapes. Additionally, one or more implementations can include bonded regions arranged in patterns that are combinations of the illustrated and described patterns/shapes.

FIGS. 17-25 illustrate additional exemplary implementations of multi-layer bags that may be formed from multi-layered lightly-laminated films. FIGS. 17-19 and 25 illustrate additional examples of bags 127 including squares 128, diamonds 130, and circles 132 representing the bonded areas of the two or more adjacent layers. In one or more implementations, such as FIGS. 17-18 and 23, each bonded pattern may have a largest TD patterned width 134 in the transverse direction (TD) of less than about 25% of the transverse width 136 of the patterned film, or less than about 20% of the transverse width of the film, or less than about 10% of the transverse width of the patterned film, or less than about 5% of the transverse width of the film. In one or more implementations, the bonded patterns should have a largest MD patterned width 138 in the machine direction of less than about 25% of the machine width 140 of the patterned film, or less than about 20% of the machine width of the film, or less than about 10% of the machine width of the film, or less than about 5% of the transverse width of the film.

In one or more implementations, the width 134 of the bonded patterns in the transverse direction may be greater than the width 142 of the un-bonded areas in the transverse direction. The width 138 of the bonded patterns in the machine direction or direction perpendicular to the transverse direction may be greater than the width of the un-bonded areas 144 in the machine direction.

Figure 17:
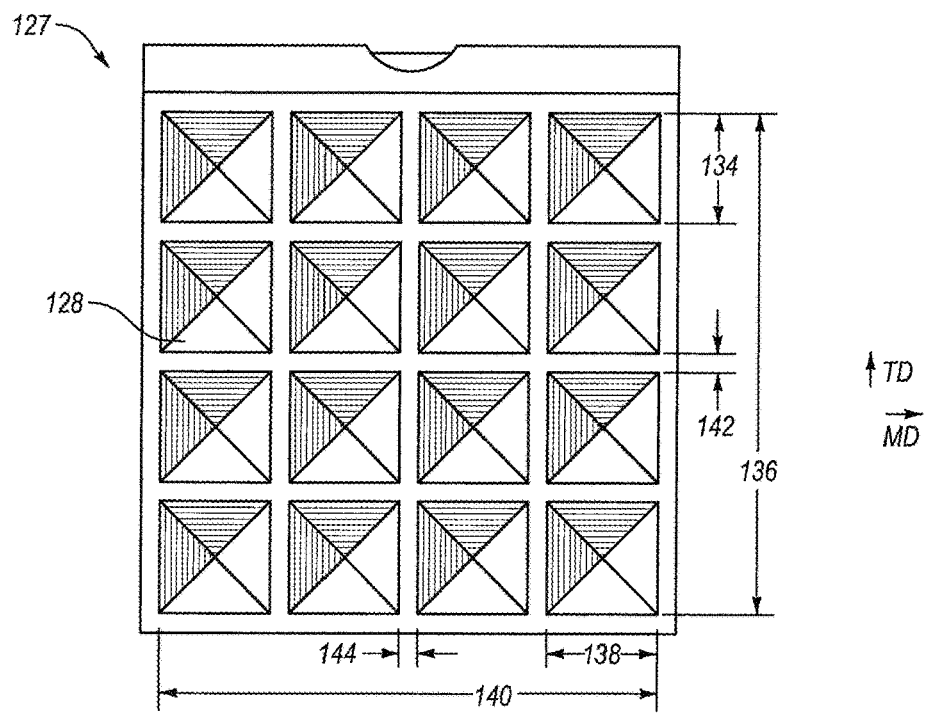
FIG. 17 illustrates another bag incorporating a multi-layered lightly-laminated film with another pattern in accordance with one or more implementations of the present invention.
Figure 18:
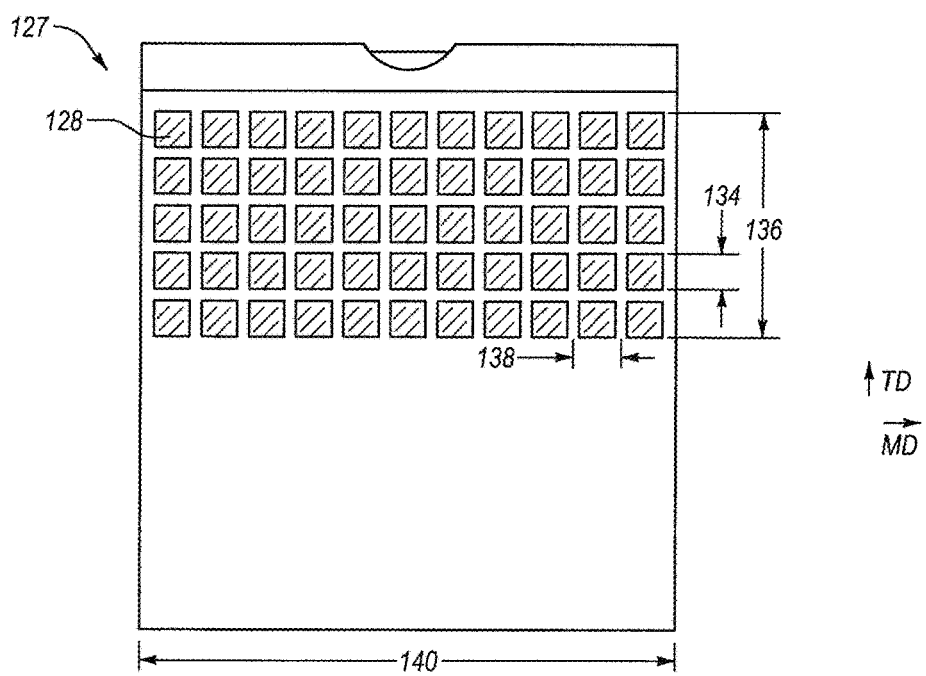
FIG. 18 illustrates another bag incorporating a top section having lightly bonded regions in accordance with one or more implementations of the present invention.
Figure 25:
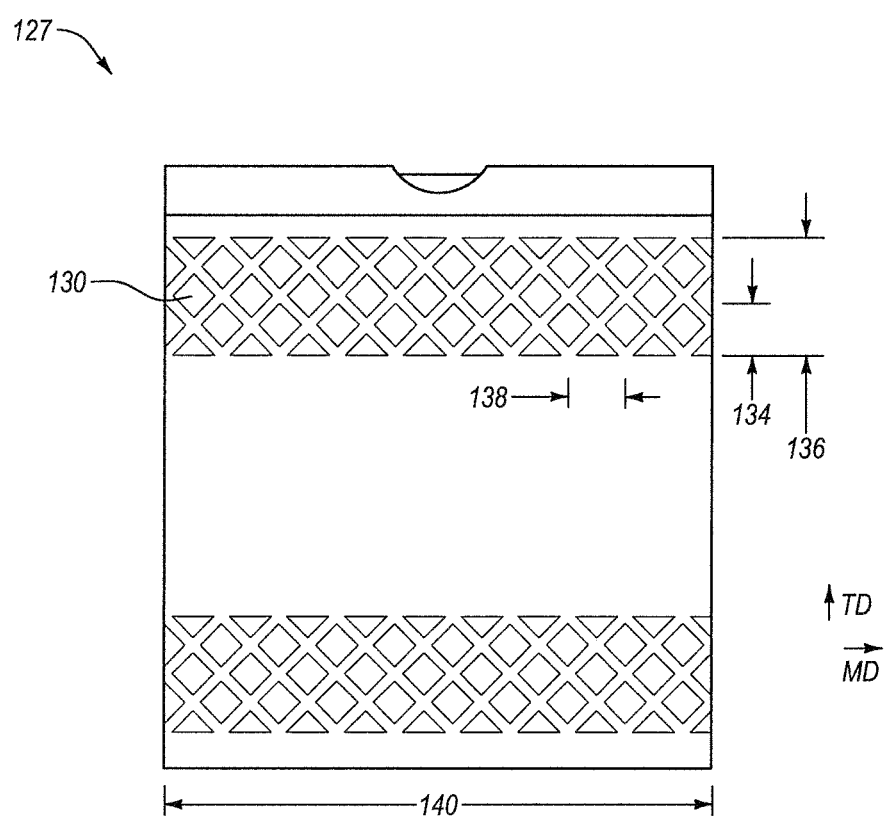
FIG. 25 illustrates still another bag incorporating a top section and a bottom section having lightly bonded regions in accordance with one or more implementations of the present invention.

The bond density of the multi-layered lightly-laminated films and bags incorporating the same can be varied to control the bond strength between the layers. For example, bonded areas of multi-layered lightly-laminated films and bags incorporating the same can be large in comparison to un-bonded areas, as seen in the implementations of FIGS. 17-18 and 25. For example, bonded areas of multi-layered lightly-laminated films and bags incorporating the same can represent at least about 50% of the total area of the entire film, the entire bag, or the section where the lamination occurs, or at least about 60% of the entire film, the entire bag, or total area of the section where the lamination occurs, at least about 70% of the entire film, the entire bag, or total area of the section where the lamination occurs, at least about 80% of the total area of the entire film, the entire bag, or section where the lamination occurs. In other embodiments, for example in FIGS. 19-20, the bonded areas of multi-layered lightly-laminated films and bags incorporating the same can represent substantially less than about 50% of the total area of the entire film, the entire bag, or section where the lamination occurs, or less than about 40% of the total area of the entire film, the entire bag, or section where the lamination occurs, or less than about 30% of the total area of the entire film, the entire bag, or section where the lamination occurs, or less than about 10% of the total area of the entire film, the entire bag, or section where the lamination occurs.

As mentioned previously, numerous methods can be used to provide the desired degree of lamination in the bonded areas. Any of the described ring rolling techniques may be combined with other techniques in order to further increase the strength of the lamination bond while maintaining bond strength below the strength of the weakest layer of the multi-layer film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Adjusting (e.g., increasing) the strength of the relatively light lamination bonding could be achieved by addition of a tackifier or adhesive to one or more of the skin plies of a multi-layer film, or by incorporating such a component into the material from which the film layer is formed. For example, the outer skin sublayers of a given layer could contain from about 0 to about 50% of a polyolefin plastomer tackifier such as a $C_4$-$C_{10}$ olefin to adjust bonding strength by increasing the tackiness of the surfaces of adjacent layers to be lightly laminated.

In one or more implementations, a component may be included to decrease tackiness. For example, the outer skin sublayers could contain higher levels of slip or anti-block agents, such as talc or oleamide (amide of oleic acid), to decrease tack. Similarly, these surfaces may include very low levels of or be substantially void of slip or anti-block agents to provide a relative increase in tackiness.

Figure 19:
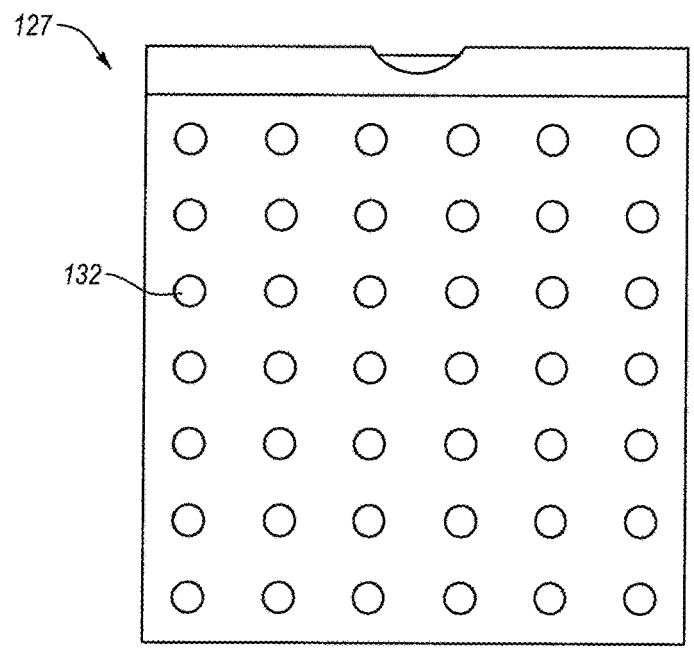
FIG. 19 illustrates another bag incorporating a multi-layered lightly-laminated film with another bond pattern in accordance with one or more implementations of the present invention.
Figure 20:
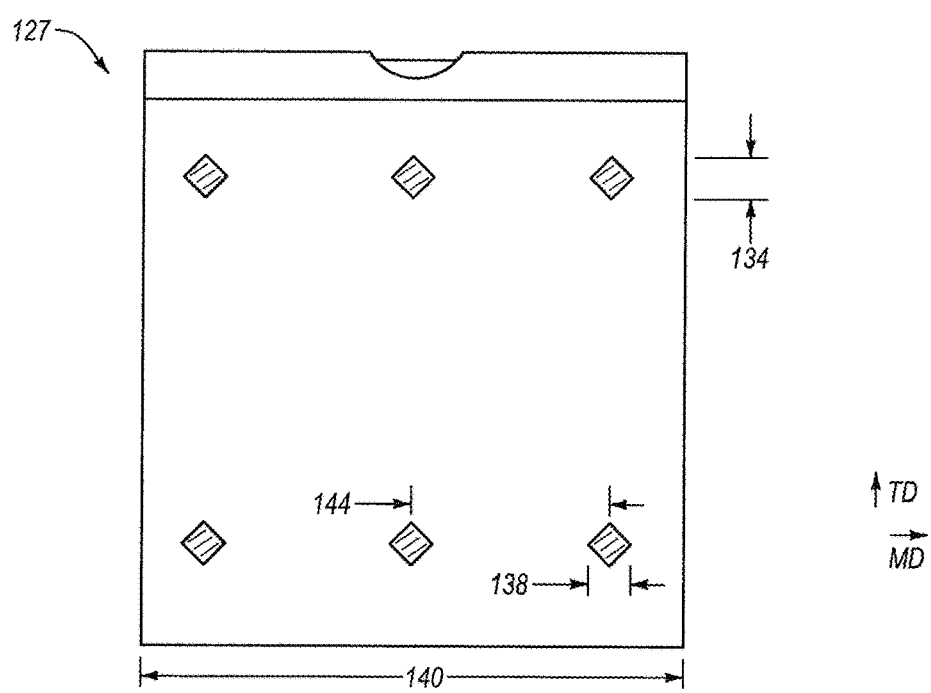
FIG. 20 illustrates a bag incorporating a multi-layered lightly-laminated film with yet another bond pattern in accordance with one or more implementations of the present invention.
Figure 21:
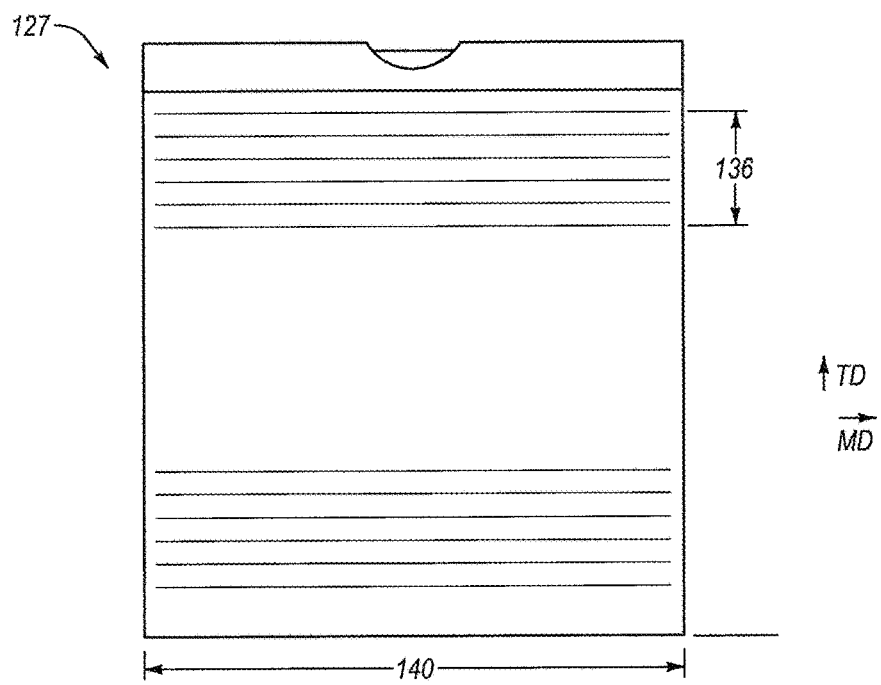
FIG. 21 illustrates another bag incorporating a top section and a bottom section having lightly bonded regions in accordance with one or more implementations of the present invention.
Figure 22:
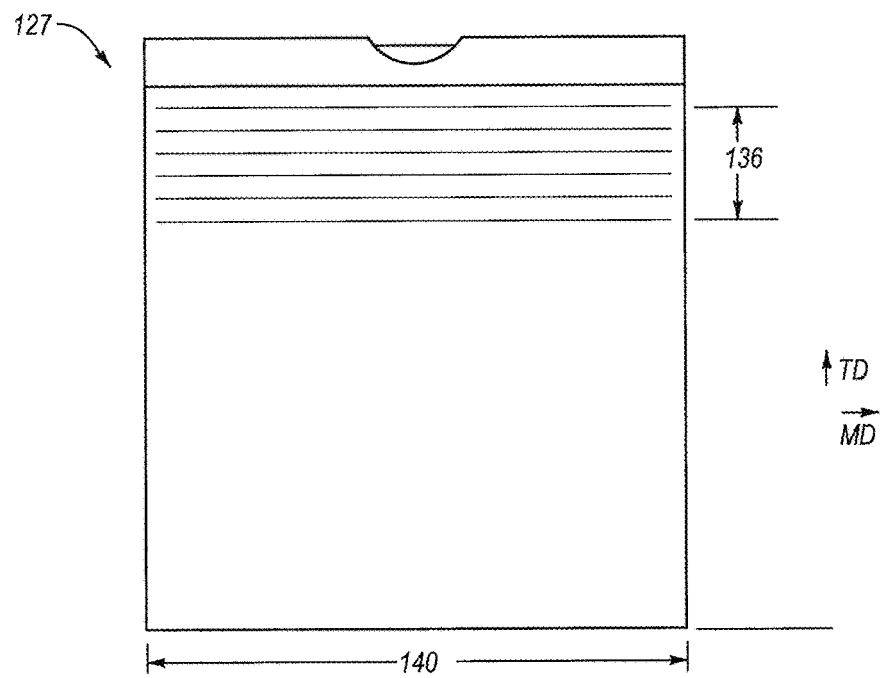
FIG. 22 illustrates another bag incorporating a top section having lightly bonded regions in accordance with one or more implementations of the present invention.
Figure 23:
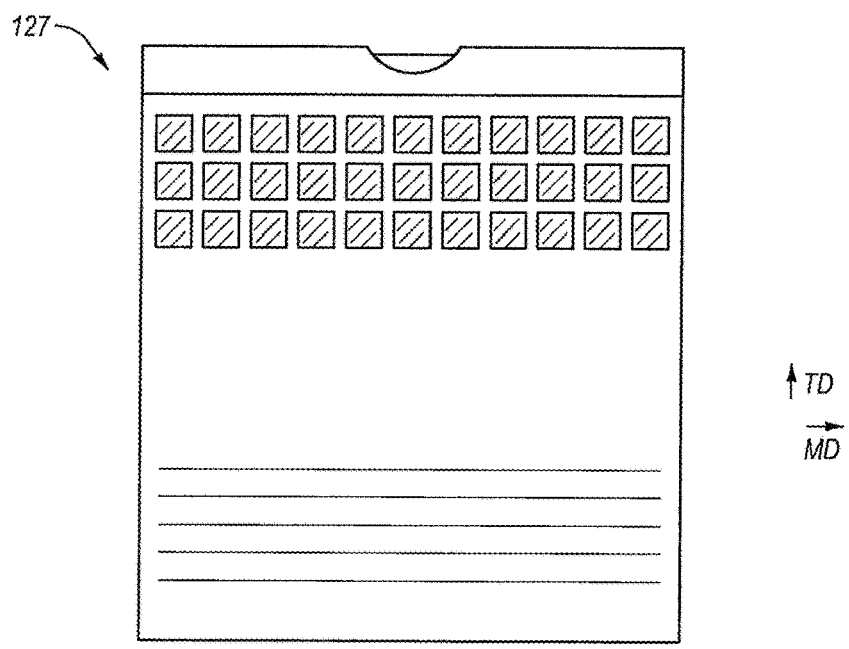
FIG. 23 illustrates another bag incorporating a top section and a bottom section having lightly bonded regions, each of a different pattern, in accordance with one or more implementations of the present invention.
Figure 24:
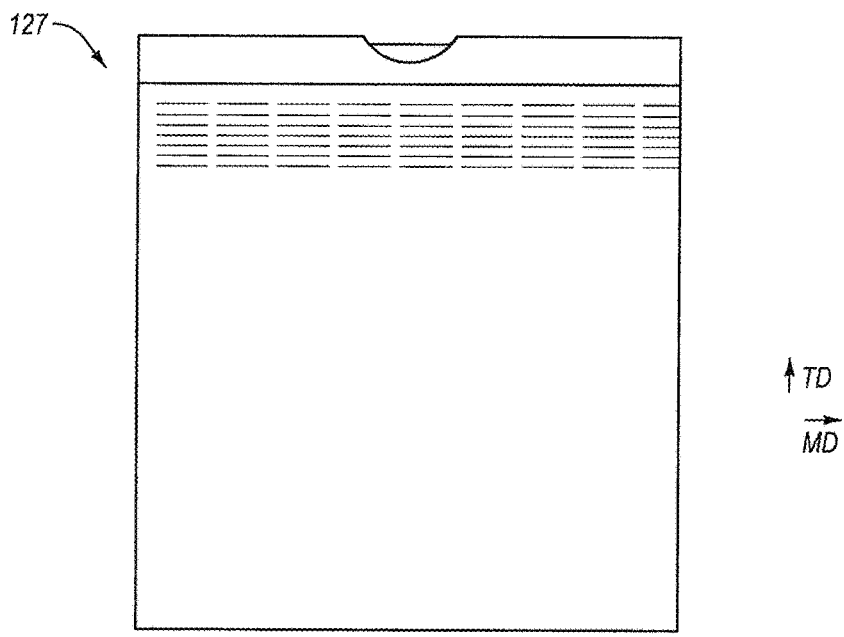
FIG. 24 illustrates another bag incorporating a top section having lightly bonded regions in accordance with one or more implementations of the present invention.

FIG. 18 shows a multi-layer bag 127 including a top section that has been both MD and TD ring rolled, while the bottom section has not been discontinuously laminated. FIG. 19 shows a bag 127 including a relatively low density of bonded circles 132 arranged over substantially the entire surface of bag 127. FIG. 20 shows a bag 127 including an even lower density of bonded diamonds near top and bottom sections of bag 127. FIG. 21 shows a multi-layer bag 127 that has been ring rolled near the top and bottom of the bag. The middle section of the bag represents an un-bonded region between the ring top and bottom portions of bag 127. FIG. 22 shows a bag 127 similar to that of FIG. 21 but in which the bottom section is un-bonded. FIG. 23 shows a bag 127 similar to that of FIG. 21, but in which the top section includes squares of bonded regions rather than being ring rolled. FIG. 24 is similar to the bag of FIG. 20, but in which the bonded ring rolled portions along the top are discontinuous. FIG. 25 shows a multi-layer bag 127 including top and bottom sections that have been DD ring rolled, while a middle section therebetween has not been discontinuously laminated In another implementation, a pattern may be formed by embossing, in a process similar to ring rolling. Embossed patterns such as squares, diamonds, circles or other shapes may be embossed into a multi-layer film such as shown in FIGS. 17-20, and 25. The embossed, laminated film layers may be prepared by any suitable means by utilizing two or more layers of preformed web of film and passing them between embossing rollers. The method of embossing multiple layers of film can involve calendar embossing two or more separate, non-laminated layers with discrete "icons" to form bonded areas or icons, each icon having a bonded length and separated from adjacent icons by an equivalent un-bonded length. Such icons may be any desired design or shape, such as a heart, square, triangle, diamond, trapezoid, or circle. In FIG. 18, the embossed icons are squares.

Figure 26:
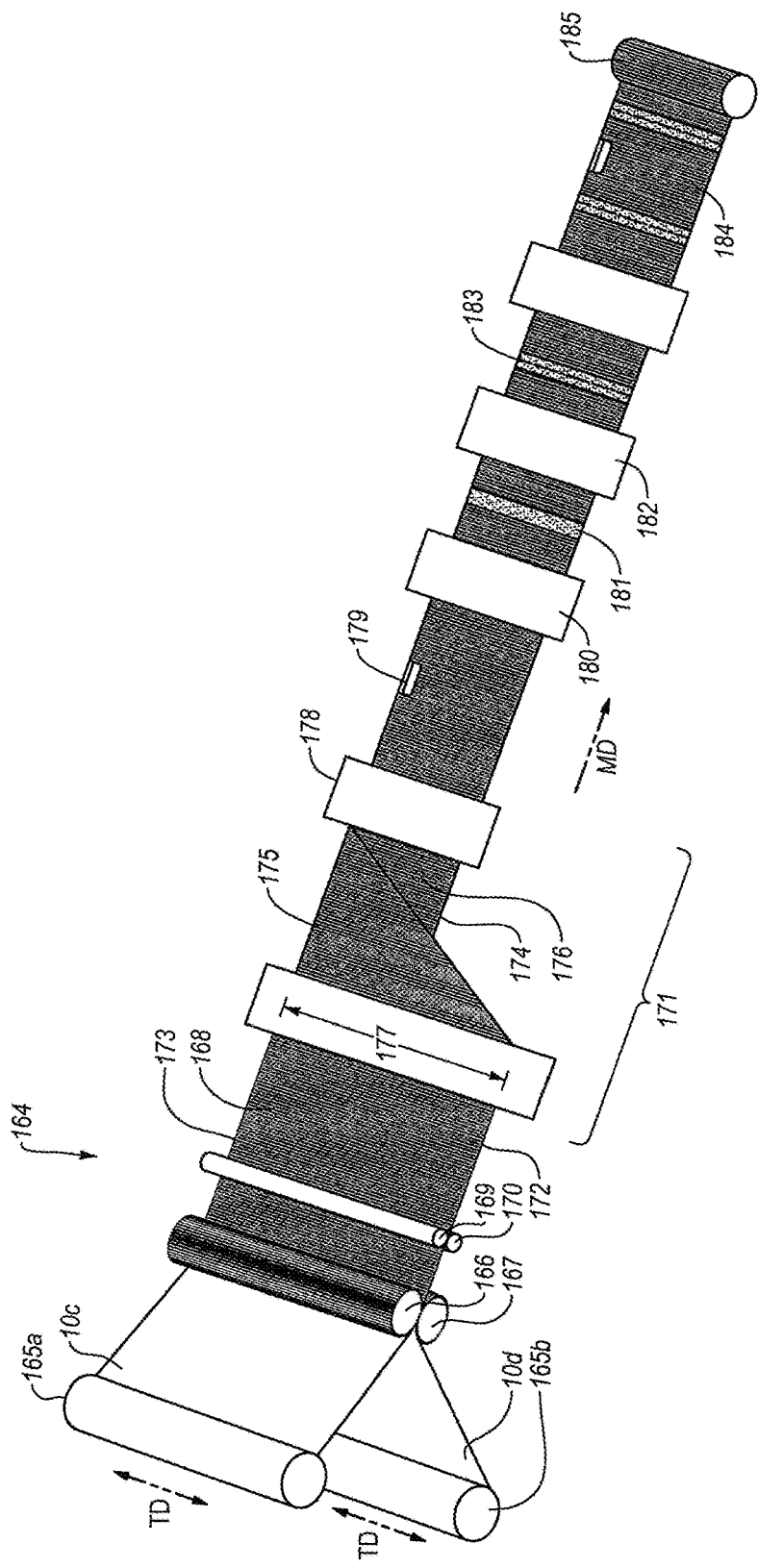
FIG. 26 illustrates a schematic diagram of a bag manufacturing process in accordance with one or more implementations of the present invention.
Figure 27:
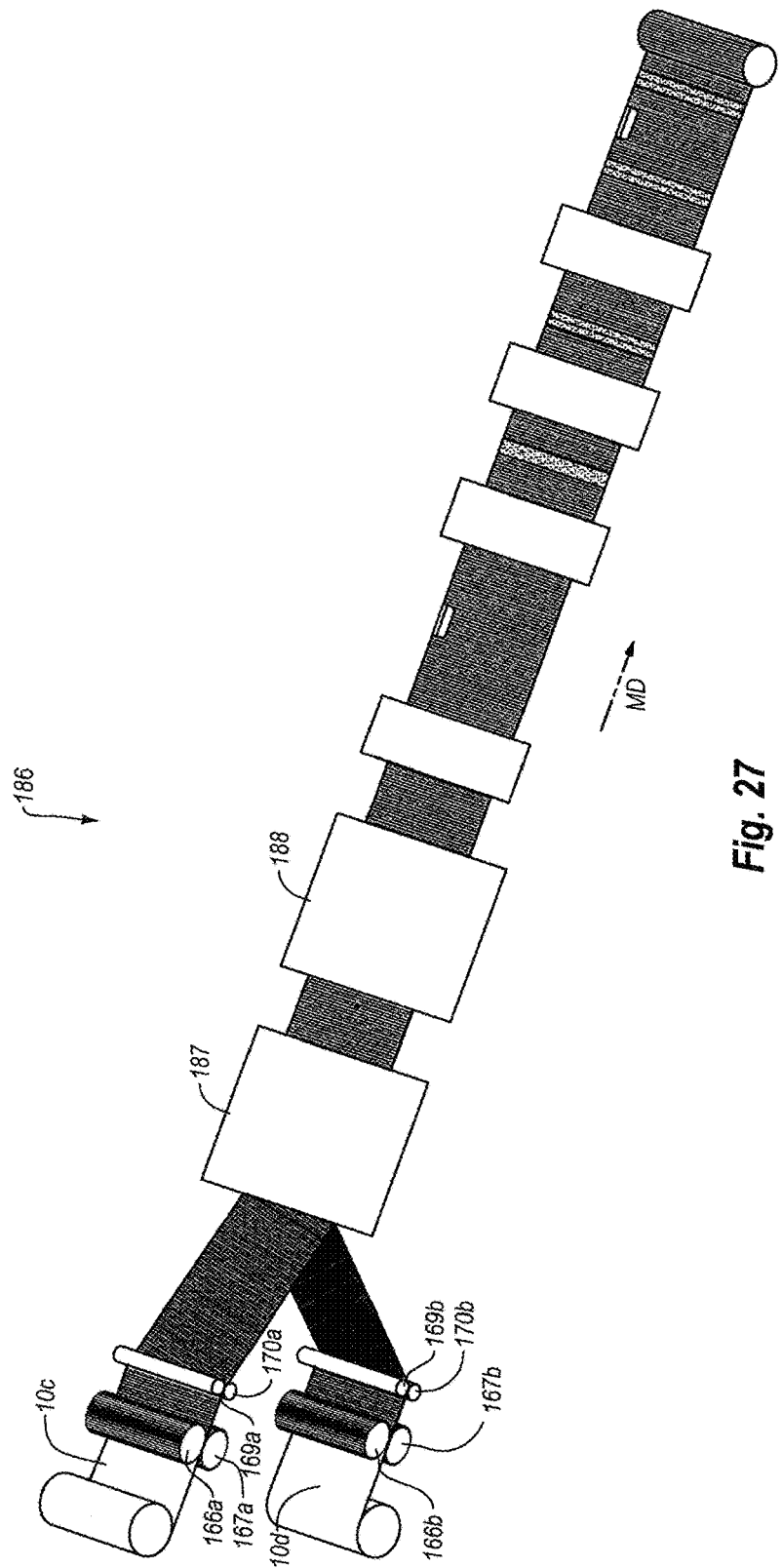
FIG. 27 illustrates a schematic diagram of another bag manufacturing process in accordance with one or more implementations of the present invention.
Figure 28:
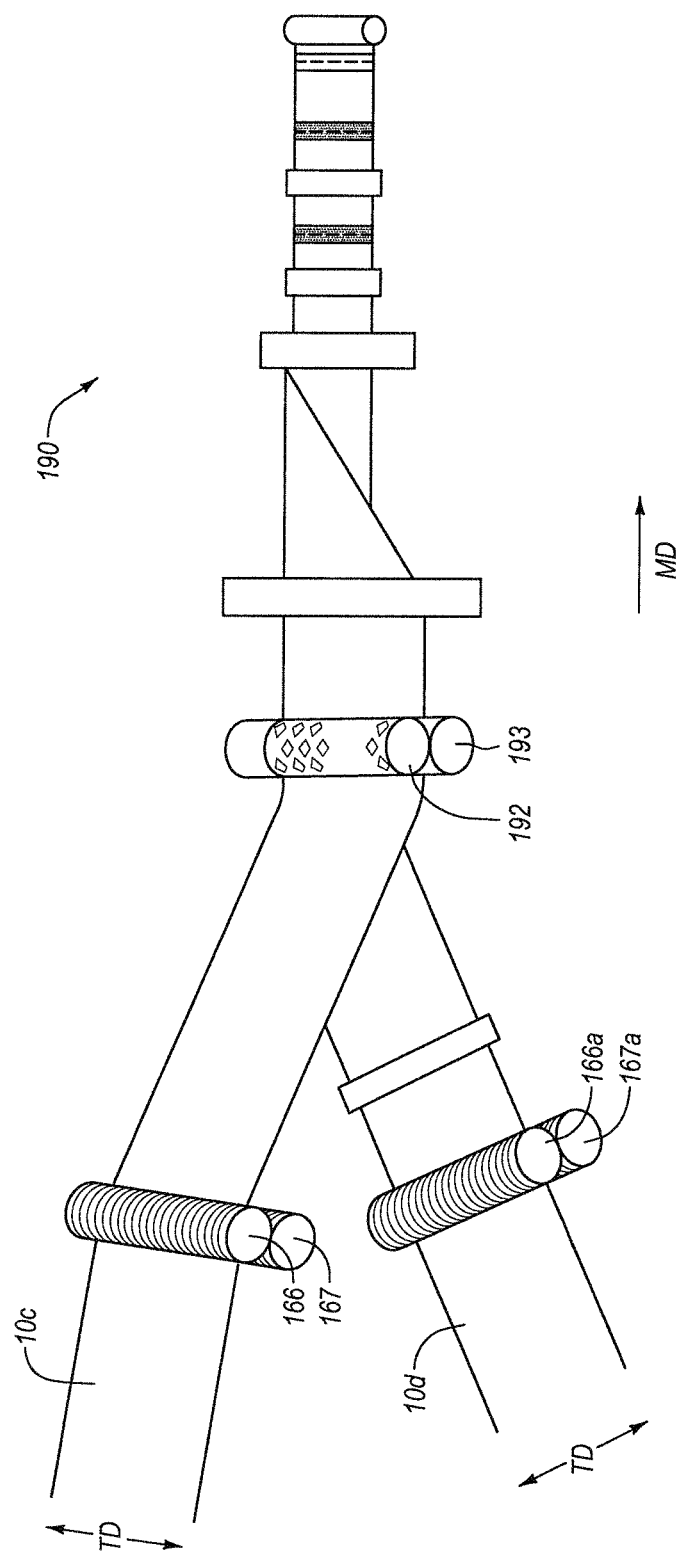
FIG. 28 illustrates a schematic diagram of another bag manufacturing process in accordance with one or more implementations of the present invention.

Implementations of the present invention can also include methods of forming multi-layered lightly-laminated film and bags including the same. FIGS. 26-28 and the accompanying description describe such methods. Of course, as a preliminary matter, one of ordinary skill in the art will recognize that the methods explained in detail herein can be modified. For example, various acts of the method described can be omitted or expanded, additional acts can be included, and the order of the various acts of the method described can be altered as desired.

FIG. 26 illustrates an exemplary embodiment of a high-speed manufacturing process 164 for creating multi-layered lightly-laminated thermoplastic film(s) and then producing multi-layered plastic bags therefrom. According to the process 164, a first thermoplastic film layer 10c and a second thermoplastic film layer 10d are unwound from roll 165a and 165b, respectively, and directed along a machine direction.

The film layers 10c, 10d may pass between first and second cylindrical intermeshing rollers 166, 167 to incrementally stretch and lightly laminate the initially separate film layers 10c, 10d to create un-bonded regions and bonded regions in at least one section of a multi-layered lightly-laminated film 168. The intermeshing rollers 166, 167 can have a construction similar to that of intermeshing rollers 12, 14 of FIGS. 1A-1B, or any of the other intermeshing rollers shown or described herein. The rollers 166, 167 may be arranged so that their longitudinal axes are perpendicular to the machine direction. Additionally, the rollers 166, 167 may rotate about their longitudinal axes in opposite rotational directions as described in conjunction with FIG. 1A. In various embodiments, motors may be provided that power rotation of the rollers 166, 167 in a controlled manner. As the film layers 10c, 10d pass between the first and second rollers 166, 167, the ridges and/or teeth of the intermeshing rollers 166, 167 can form a multi-layered lightly-laminated film 168.

During the manufacturing process 164, the multi-layered lightly-laminated film 168 can also pass through a pair of pinch rollers 169, 170. The pinch rollers 169, 170 can be appropriately arranged to grasp the multi-layered lightly-laminated film 168.

A folding operation 171 can fold the multi-layered lightly-laminated film 168 to produce the sidewalls of the finished bag. The folding operation 171 can fold the multi-layered lightly-laminated film 168 in half along the transverse direction. In particular, the folding operation 171 can move a first edge 172 adjacent to the second edge 173, thereby creating a folded edge 174. The folding operation 171 thereby provides a first film half 175 and an adjacent second web half 176. The overall width 177 of the second film half 176 can be half the width 177 of the pre-folded multi-layered lightly-laminated film 168.

To produce the finished bag, the processing equipment may further process the folded multi-layered lightly-laminated film 168. In particular, a draw tape operation 178 can insert a draw tape 179 into ends 172, 173 of the multi-layered lightly-laminated film 168. Furthermore, a sealing operation 180 can form the parallel side edges of the finished bag by forming heat seals 181 between adjacent portions of the folded multi-layered lightly-laminated film 168. The heat seal 181 may strongly bond adjacent layers together in the location of the heat seal 181 so as to tightly seal the edges of the finished bag. The heat seals 181 may be spaced apart along the folded multi-layered lightly-laminated film 168 to provide the desired width to the finished bags. The sealing operation 180 can form the heat seals 181 using a heating device, such as, a heated knife.

A perforating operation 182 may form a perforation 183 in the heat seals 181 using a perforating device, such as, a perforating knife. The perforations 183 in conjunction with the folded outer edge 174 can define individual bags 184 that may be separated from the multi-layered lightly-laminated film 168. A roll 185 can wind the multi-layered lightly-laminated film 168 embodying the finished bags 184 for packaging and distribution. For example, the roll 185 may be placed into a box or bag for sale to a customer.

In still further implementations, the folded multi-layered lightly-laminated film 168 may be cut into individual bags along the heat seals 181 by a cutting operation. In another implementation, the folded multi-layered lightly-laminated film 168 may be folded one or more times prior to the cutting operation. In yet another implementation, the side sealing operation 180 may be combined with the cutting and/or perforation operations 182.

One will appreciate in light of the disclosure herein that the process 164 described in conjunction with FIG. 26 can be modified to omit or expand acts, vary the order of the various acts, or otherwise alter the process, as desired. For example, three or more separate film layers can be discontinuously laminated together to form a multi-layered lightly-laminated film 168 similar to that shown in FIG. 1C.

FIG. 27 illustrates another manufacturing process 186 for producing a plastic bag from a multi-layered lightly-laminated film. The process 186 can be similar to process 164 of FIG. 26, except that the film layers 10c, 10d are folded in half to form c-, u-, or j-folded films prior to winding on the rolls 165a, 165b. Thus, in such implementations, the films 10c, 10d unwound from the rolls 165a, 165b are already folded.

Additionally, the manufacturing process 186 illustrates that each film 10c, 10d can pass through a set of intermeshing rollers 166a, 167a, 166b, 166b to incrementally stretch the films prior to bonding. The manufacturing process 186 can then include an insertion operation 187 for inserting the folded film 10d into the folded film 10c. Insertion operation 187 can combine and adhesively laminate the folded films 10c, 10d using any of the apparatus and methods described in U.S. patent application Ser. No. 13/225,930 filed Sep. 6, 2011 and entitled Apparatus For Inserting A First Folded Film Within A Second Folded Film and Ser. No. 13/225,757 filed Sep. 6, 2011 and entitled Method For Inserting A First Folded Film Within A Second Folded Film, each of which are incorporated herein by reference in their entirety.

Additionally, FIG. 27 illustrates that the film layers 10c, 10d can then pass through a lamination operation 188 to lightly bond or laminate the films 10c, 10d together. Lamination operation 188 can lightly laminate the folded films 10c, 10d together via adhesive bonding, pressure bonding, ultrasonic bonding, corona lamination, and the like. Alternatively, lamination operation can lightly laminate the folded films 10c, 10d together by passing them through machine-direction ring rolls, transverse-direction ring rolls, diagonal-direction ring rolls, SELF'ing rollers, embossing rollers, or other intermeshing rollers.

FIG. 28 illustrates another manufacturing process 190 for producing a multi-layered lightly-laminated film and a multi-layered bag therefrom. The process 190 can be similar to process 164 of FIG. 25, except that each film layer 10c and 10d may be run through intermeshing rollers (e.g., TD ring rollers) 166, 167 and 166a, 167a, respectively, prior to discontinuous lamination of layers 10c and 10d to one another. Alternately MD ring rollers could be used. Similar to process 164 of FIG. 25, layers 10c and 10d may then be discontinuously laminated together by passing through intermeshing rollers 192, 193, which may be similar to rollers 153, 154 of FIGS. 11A-11B.

I. EXAMPLES

Multi-layered lightly-laminated films according to the present invention were formed according to various ring rolling processes. Table I below lists various discontinuously laminated films and comparative films that were tested. Table II lists the physical properties of the films of Table I. The results recorded in Table II indicate that the bi-layer films that were lightly bonded together with discontinuous lamination exhibit significantly improved strength properties, such as the energy to maximum load (Dynatup Max), which relates to impact resistance. The melt index of the layers of the films were determined under ASTM D-1238, Condition E. It is measured at 190° C. and 2.16 kilograms and reported as grams per 10 minutes.

TABLE I

Discontinuously Laminated Films

| Film | Layer 1 | Process | Layer 2 | Process | Discontinuous Lamination | Gauge (Mils) |
|---|---|---|---|---|---|---|
| A | LLDPE | | | | | 0.40 |
| B | LDPE | | | | | 0.40 |
| C | HDPE | | | | | 0.40 |
| D | LLDPE | | | | Yes | 0.40 |
| E | LDPE | | | | Yes | 0.40 |
| F | HDPE | | | | Yes | 0.40 |
| G | LLDPE | | LLDPE | | Yes | 0.80 |
| H | LDPE | | LDPE | | Yes | 0.80 |
| I | HDPE | | HDPE | | Yes | 0.80 |
| J | LLDPE | TD RR | LDPE | TD RR | Yes | 0.80 |
| K | LLDPE | TD RR | HDPE | TD RR | Yes | 0.80 |
| L | LDPE | TD RR | HDPE | TD RR | Yes | 0.80 |
| M | LLDPE | MD RR | LLDPE | TD RR | Yes | 0.80 |
| N | LLDPE | MD RR | LDPE | TD RR | Yes | 0.80 |
| O | LLDPE | MD RR | HDPE | TD RR | Yes | 0.80 |

LLDPE has a density of 0.920 and a Melt Index of 1.000. LDPE has a density of 0.926 and a Melt Index of 0.800. HDPE has a density of 0.959 and a Melt Index of 0.057. TD RR is TD ring rolling at 40 Pitch. MD RR is MD ring rolling at 60 Pitch. Discontinuous Lamination was achieved through SELF'ing at a DOE of 0.038".

TABLE II

Physical Properties

| Film | Tear MD | Tear TD | Yield MD | Yield TD | Peak Load MD | Peak Load TD | Strain@Break MD | Strain@Break TD | DynatupEnergy to max. load |
|---|---|---|---|---|---|---|---|---|---|
| A | 165 | 274 | 0.66 | 0.64 | 3.44 | 1.59 | 532 | 606 | 3.10 |
| B | 72 | 283 | 0.81 | 0.86 | 3.72 | 2.28 | 482 | 660 | 0.25 |
| C | 3 | 314 | 1.74 | 0.86 | 3.83 | 0.89 | 268 | 135 | N.A. |
| D | 181 | 176 | 0.55 | 0.60 | 1.21 | 1.44 | 352 | 557 | 3.20 |
| E | 175 | 197 | 0.70 | 0.75 | 1.46 | 1.21 | 331 | 473 | 1.71 |
| F | 12 | 170 | 0.30 | 3.13 | 1.70 | 0.70 | 115 | 64 | 0.45 |
| G | 372 | 427 | 1.12 | 1.25 | 2.92 | 2.59 | 389 | 551 | 5.81 |
| H | 312 | 375 | 1.39 | 1.54 | 2.83 | 2.39 | 346 | 518 | 3.60 |
| I | 14 | 220 | 1.20 | 0.44 | 2.71 | 1.07 | 112 | 78 | 0.87 |
| J | 392 | 385 | 1.21 | 1.40 | 3.19 | 2.71 | 385 | 540 | 4.15 |
| K | 191 | 292 | 1.75 | 1.27 | 2.62 | 1.53 | 61 | 535 | 3.32 |
| L | 158 | 288 | 2.20 | 1.50 | 3.00 | 1.55 | 252 | 498 | 2.63 |
| M | 539 | 368 | 1.26 | 1.26 | 3.32 | 3.06 | 456 | 401 | 7.19 |
| N | 544 | 383 | 1.27 | 1.69 | 2.18 | 2.91 | 365 | 362 | 6.96 |
| O | 574 | 189 | 1.44 | 3.87 | 1.74 | 3.87 | 404 | 157 | 1.41 |
| Control | 225 | 625 | 1.46 | 1.43 | 6.29 | 4.36 | 476 | 665 | |

Tear in grams.
Yield in Lb$_f$
Peak Load in Lb$_f$
Strain@Break in %
Dynatup Energy to Max in In-Lb$_f$
Control is 0.9 Mil LDPE film As shown in Table III, another set of films was evaluated with different levels of stretch processes with and without discontinuous lamination of adjacent layers. The results show significantly increased values of Dynatup Energy to maximum load as a result of discontinuous lamination.

TABLE III

Additional Examples

| Film | Layer 1 Process | Layer 2 Process | Discontinuous Lamination | Dynatup Energy to max. load | Gauge Initial (mils) | Gauge Final (mils) |
|---|---|---|---|---|---|---|
| P | None | None | Yes | 18.3 | 2.14 | 2.12 |
| Q | MD-1 | TD-1 | No | 7.2 | 2.14 | 1.92 |
| R | MD-1 | TD-1 | Yes | 17.1 | 2.14 | 1.93 |
| S | MD-2 | TD-2 | No | 8.7 | 2.14 | 1.68 |
| T | MD-2 | TD-2 | Yes | 15.3 | 2.14 | 1.63 |
| Base | None | None | No | 5 | 1.07 | 1.07 |

As shown in Table IV, samples of cold processed MD ring rolled (at 0.100" DOE, 0.100" pitch, LDPE film were laminated under a cold ring rolling process to achieve unexpectedly superior tear resistance properties. The MD Tear and the TD Tear resistance values were synergistically enhanced as a result of the discontinuous lamination process. Bond strength could be further increased while still being less than the strength of the weakest layer by addition of a tackifier, an adhesive, corona treatment, etc. to increase tackiness between the layers.

TABLE IV

Ring Rolled Laminates

| Sample | MD Tear | TD Tear |
|---|---|---|
| TD ring rolled laminate of A and B, 21.5 gsm[a] | 429 | 881 |
| A. MD ring rolled, Black top layer[b] | 193 | 580 |
| B. MD ring rolled, White bottom layer[c] | 261 | 603 |
| TD ring rolled laminate of C and D, 18.8 gsm | 314 | 876 |
| C. MD ring rolled, Black top layer[d] | 170 | 392 |
| D. MD ring rolled, Black bottom layer[d] | 151 | 470 |
| TD ring rolled laminate of E and F, 21.1 gsm | 312 | 1018 |
| E. MD ring rolled, Black top layer[b] | 218 | 765 |
| F. MD ring rolled, Black bottom layer[d] | 170 | 387 |

[a]TD ring rolling was 0.040" pitch tooling run at 0.020" DOE. The A and B webs were simultaneously run first through the MD and then the TD tooling.
[b]14 gsm 3 ply coextruded black layer with outer skin plies containing 30% DOW Affinity™ 8100 and 2% talc, processed at blowup ratio A and MD ring rolled. MD ring rolling was 0.100" pitch tooling run at 0.100" DOE.
[c]14 gsm 3 ply coextruded white layer with 2% slip agent in outer skin plies, processed at blowup ratio 1.5 A and MD ring rolled at 0.100" pitch tooling run at 0.100" DOE.
[d]14 gsm 3 ply coextruded black layer with outer skin plies containing 30% DOW Affinity™ 8100 and 2% talc, processed at blowup ratio 1.5 A and MD ring rolled at 0.100" pitch tooling run at 0.100" DOE.

Figure 29:
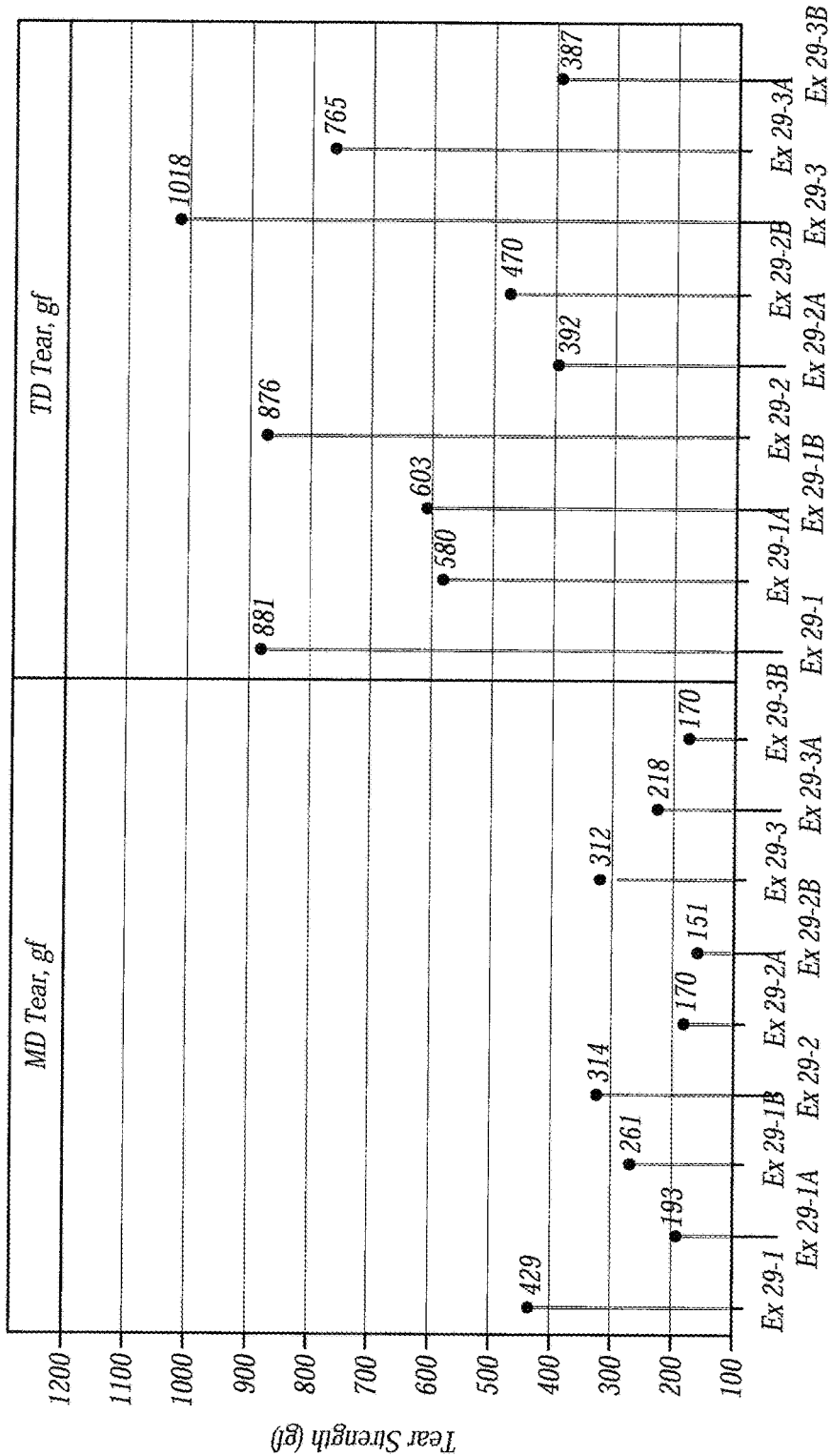
FIG. 29 charts mean MD and TD tear resistance for various tested multi-layered lightly-laminated films.

The MD and TD tear values shown in Table IV, (also shown in FIG. 29) show how the MD tear value is significantly increased relative to the MD tear value of the individual layers. FIG. 29 displays the MD and TD tear performance of the three different discontinuously laminated multi-layer films that were lightly laminated to one another via ring rolling. The data shows an additive or synergistic effect in both MD and TD tear resistance. For example, Example 29-1A exhibits an MD tear resistance of 193 g-f, while Example 29-1B exhibits an MD tear resistance of 261 g-f. When both layers are lightly laminated together by TD ring rolling, the MD tear resistance is 429 g-f. This is nearly as great as the additive strength of the two layers, which would be 454 g-f. Such results are particularly surprising and advantageous, as when the two layers are tightly laminated together (e.g., co-extruded), the strength of the composite film typically reverts to the have a strength approximately equal to that of the weakest layer (i.e., about 193 g-f). Thus, the light, discontinuous lamination of adjacent layers into a multi-layer film provides significant increases in strength.

Examples 29-1 through 29-3 were each discontinuously laminated by MD ring rolling at a pitch of 0.100", a DOE of 0.100", and simultaneously TD ring rolling at a pitch of 0.040" and a DOE of 0.020".

In Table V, one layer was subjected to cold processing by MD ring rolling and the other layer was subjected to cold processing by TD ring rolling and then the two layers were laminated together by a butene-1-copolymer hot melt adhesive, Rextac® RT 2730. The adhesive was discontinuously applied so as to provide bonded and adjacent unbonded areas to the discontinuously bonded multi-layer film. The bond strength of the adhesive lamination was varied by varying how much adhesive was coated on. Table V also shows comparative properties of the two layers when not discontinuously bonded together, as well as the properties of each layer and comparable layers not cold processed by ring rolling. The results show that even with very low adhesive coating, superior Dynatup, MD Tear and TD Tear properties are achieved compared to two layers of non-laminated film or one layer of thicker film.

In particular, the results from Table V show adhesively laminating an MD ring rolled film and a TD ring rolled film can balance the MD and TD tear resistance. Furthermore, the individual values for the Dynatup, MD tear resistance, and TD tear resistance properties are unexpectedly higher than the sum of the individual layers. Thus, the incrementally-stretched adhesively-laminated films provide a synergistic effect.

More specifically, as shown by the results from Table V, the TD tear resistance of the multi-layered lightly-laminated films can be greater than a sum of the TD tear resistance of the individual layers. Similarly, the MD tear resistance of the multi-layered lightly-laminated films can be greater than a sum of the MD tear resistance of the individual layers. Along related lines, the Dynatup peak load of the multi-layered lightly-laminated films can be greater than a sum of a Dynatup peak load of the individual layers.

In Table VI, two layers of the same film composition as in Table V were each subjected to cold processing by MD ring rolling at 0.110" DOE followed by cold TD ring rolling at 0.032" DOE and then the two layers were discontinuously bonded by the same adhesive at different coating levels. Table VI also shows comparative properties of a single layer with a higher basis weight which was not cold processed by ring rolling. Note that even at low adhesive levels and low tensile peel, that the caliper, Dynatup, Dart Drop, and MD tear remain high relative to a heavier basis weight single layer film. Although the TD tear value drops, the MD tear represents the "weak link" of the film, and the MD tear value has been improved, so that the MD tear value is nearly as great as the TD tear value.

Additionally, the results from Table VI in conjunction with the comparison data from Tables V show that multi-layered lightly-laminated films of one or more implementations can allow for a reduction in basis weight (gauge by weight) as much as 50% and still provide enhanced strength parameters.

In addition to allowing for films with less raw material yet enhanced strength parameters, the results from Table VI further show that multi-layered lightly-laminated films of one or more implementations can have an increased gauge (i.e., caliper) despite the reduction in basis weight. Some consumers may associate thinner films with decreased strength. Indeed, such consumers may feel that they are receiving less value for their money when purchasing thermoplastic film products with smaller gauges. One will appreciate in light of the disclosure herein that despite a reduction in raw material, multi-layered lightly-laminated films of one or more implementations may be and look thicker than a single layer of film with a higher basis weight. Thus, one or more implementations can enhance the look and feel of a film in addition to enhancing the strength parameters of the film.

TABLE V

Discontinuous Adhesive Lamination of Ring Rolled Films

|  | Coat Weight g/sq. ft. | Gauge by Wt. | Tensile Peel (g-f) | Dynatup Peak Load (lb-f) | Dynatup Energy to max load (in. lb-f) | MD Tear (g-f) | TD Tear (g-f) |
| --- | --- | --- | --- | --- | --- | --- | --- |
| Sample[a] | 0.225 | 0.84 | N/A | 11.3 | 8.4 | 434 | 585 |
| Sample[a] | 0.056 | 0.84 | N/A | 11.1 | 11.2 | 496 | 539 |
| Sample[a] | 0.015 | 0.84 | 61 | 10.5 | 9.2 | 387 | 595 |
| Sample[a] | 0.012 | 0.84 | 57 | 11.3 | 10.4 | 425 | 643 |
| Comparative A[b] | NA | 0.84 | N/A | 9.4 | 6.9 | 326 | 502 |
| Comparative B[c] | NA | 0.4 | N/A | 4.6 | 4.4 | 101 | 60 |
| Comparative C[d] | NA | 0.44 | N/A | 5.4 | 4.8 | 173 | 475 |
| Comparative D[e] | NA | 0.6 | N/A | 5.1 | 6.3 | 298 | 473 |
| Comparative E[f] | NA | 0.9 | NA | 4.3 | 3.8 | 262 | 843 |

[a] two 0.42 g/cm² layers of film each having a core ply of LLDPE with white pigment and outer plies of LLDPE\LDPE\anti-block blend, one layer is MD ring rolled and the other layer is TD ring rolled.
[b] two 0.42 g/cm² layers with no adhesive, one MD ring rolled, one TD ring rolled.
[c] one layer TD ring rolled.
[d] one layer MD ring rolled.
[e] mono-layer, no ring rolling.
[f] mono-layer, no ring rolling.

TABLE VI

Discontinuous Adhesive Lamination of Ring Rolled Film

| Sample | Coat Weight g/sq. ft. | Gauge by wt. (mils) | Caliper 1" Foot (mils) | Tensile Peel (g-f) | Dynatup Peak Load (lb-f) | Dynatup Energy to max load (in. lb-f) | Dart Drop F50 (g-f) | MD Tear (g-f) | TD Tear (g-f) |
|---|---|---|---|---|---|---|---|---|---|
| 1 | 0.0300 | 0.64 | 1.71 | 81.5 | 11.5 | 11.28 | 254.0 | 418 | 511 |
| 2 | 0.0150 | 0.65 | 1.85 | 25.5 | 10.3 | 9.61 |  | 349 | 441 |
| 3 | 0.0100 | 0.67 | 1.81 | 27.6 | 10.6 | 9.34 | 264.0 | 353 | 406 |
| 4 | 0.0075 | 0.66 | 1.79 | 2.27 | 9.7 | 10.99 |  | 335 | 423 |
| 5 | 0.0060 | 0.66 | 1.87 | 7.79 | 9.9 | 12.21 | 260.0 | 319 | 450 |
| NA, Single layer | NA | 0.9 | 0.88 | NA | 4.3 | 3.8 | 180 | 262 | 843 |

In Table VII, one white layer of HDPE was cold stretched by MD ring rolling at 0.110 DOE and another black layer of LLDPE was cold stretched by MD ring rolling at 0.110 DOE followed by TD ring rolling at 0.032 DOE and then discontinuously bonded together with the same adhesive. Again, with the two ply laminates, superior properties were obtained even at very low adhesive levels compared to a single ply film. Although the TD tear value drops, the MD tear represents the "weak link" of the film, and the MD tear value has been improved, so that the MD tear value is nearly as great as the TD tear value.

TABLE VII

Discontinuous Adhesive Lamination of Twice Ring Rolled Film

| Sample | Coat Weight g/sq. ft. | Gauge by wt. (mils) | Dynatup Peak Load (lb-f) | Dynatup Energy to max load (in. lb-f) | Dart Drop F50 (g-f) | MD Tear (g-f) | TD Tear (g-f) |
|---|---|---|---|---|---|---|---|
| 1 | 0.0300 | 0.67 | 11.8 | 11.86 | 284 | 357 | 575 |
| 2 | 0.0150 | 0.67 | 11.8 | 14.21 |  | 357 | 532 |
| 3 | 0.0100 | 0.67 | 11.0 | 10.77 | 288 | 373 | 502 |
| 4 | 0.0075 | 0.67 | 11.8 | 11.60 |  | 360 | 530 |
| 5 | 0.0060 | 0.67 | 12.6 | 10.57 | 260 | 385 | 535 |
| NA, Single layer | NA | 0.67 | 4.3 | 3.8 | 180 | 262 | 843 |

Figure 30:
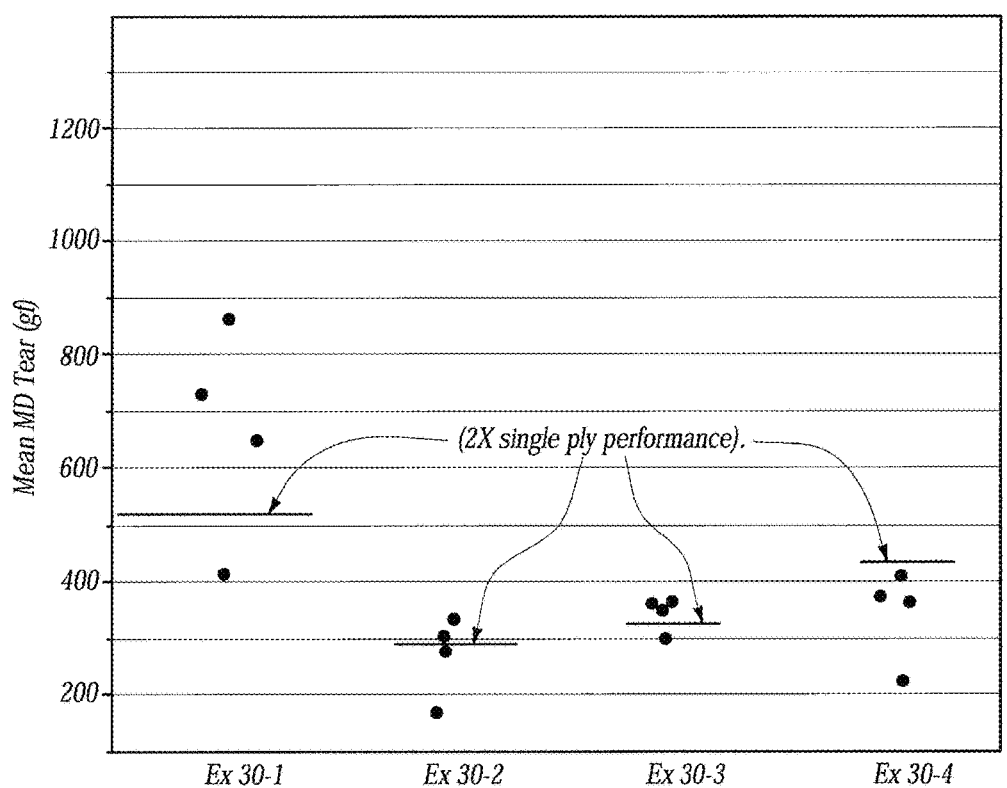
FIG. 30 charts MD tear resistance for additional tested multi-layered lightly-laminated films.

In Table VIII, the performance of four different multi-layered lightly-laminated films that were also ultrasonically bonded was tested. Each film was tested using four different patterns applied in conjunction with the ultrasonic bonding laminating the two adjacent film layers together. The data of Table VIII is also presented in graphic form in FIG. 30. The data is grouped in the x direction by the film used, while individual data points represent film and pattern combinations. The data shows differences in performance based on the film used. For example, four individual samples differing in pattern used of example 30-1 were made of a substantially pure LLDPE material without anti-block agents. Three of the four data points of example 30-1 exhibited relatively high tackiness between layers, which provided synergistic results better than additive effects. Patterns 7TD, 7MD, and 0 also generally enhance the performance as compared to pattern "6", for any of the given films. It was observed that the tackiness of the adjacent layers for example 30-2, 30-3, and 30-4 were significantly lower than for the data points of example 30-1. The tackiness of these samples may be further improved by addition of an adhesive between the layers, which may be expected to provide performance closer to that seen for example 30-1.

TABLE VIII

| Sample | Pattern | MD Tear (g-f) | Std. Dev. (g-f) |
|---|---|---|---|
| 30-1A[a] | 0 | 641 | 126 |
| 30-1B[a] | 6 | 406 | 202 |

TABLE VIII-continued

| Sample | Pattern | MD Tear (g-f) | Std. Dev. (g-f) |
|---|---|---|---|
| 30-1C[a] | 7MD | 721 | 135 |
| 30-1D[a] | 7TD | 855 | 291 |
| 30-2A[b] | 0 | 295 | 138 |
| 30-2B[b] | 6 | 160 | 88 |
| 30-2C[b] | 7MD | 325 | 38 |
| 30-2D[b] | 7TD | 265 | 141 |
| 30-3A[c] | 0 | 292 | 57 |
| 30-3B[c] | 6 | 339 | 100 |
| 30-3C[c] | 7MD | 357 | 82 |
| 30-3D[c] | 7TD | 352 | 53 |
| 30-4A[d] | 0 | 357 | 93 |
| 30-4B[d] | 6 | 214 | 111 |

TABLE VIII-continued

| Sample | Pattern | MD Tear (g-f) | Std. Dev. (g-f) |
|---|---|---|---|
| 30-4C[d] | 7MD | 365 | 61 |
| 30-4D[d] | 7TD | 403 | 80 |

[a]Examples 30-1 were formed of a pure LLDPE material made without anti-block agents to encourage tackiness between the layers. The LLDPE material used had a MI of 1.0 and density of 0.920 g/cm³. It was 0.6 mils thick per layer.
[b]Examples 30-2 were formed of a 2 ply film that had been laminated together using both MD and TD ring rolling. MD ring rolling was at 0.100" pitch tooling run at 0.100" DOE. TD ring rolling was at 0.040" pitch tooling run at 0.020" DOE. The webs were simultaneously run first through the MD then the TD tooling. Each ply of the film was itself a 3-layer (15%-70%-15%) coextruded structure 0.6 mils thick per layer. The core was a LLDPE material, and the outer skins included a $C_6$ olefin for improved affinity.
[c]Examples 30-3 were formed of a 2 ply film that had been laminated together using both MD ring rolling and SELF'ing. MD ring rolling was at 0.100" pitch tooling run at 0.100" DOE. SELF'ing was at 0.040" pitch tooling run at 0.032" DOE with a 7 tooth diamond pattern. The webs were simultaneously run first through the MD then the SELF tooling. Each ply of the film was the same as that used in Examples 30-2.
[d]Examples 30-4 were formed of a 2 ply film that had been laminated together using both MD and TD ring rolling. MD ring rolling was at 0.100" pitch tooling run at 0.100" DOE. TD ring rolling was at 0.040" pitch tooling run at 0.020" DOE. The webs were simultaneously run first through the MD then the TD tooling. One ply of the two layer film was itself a 3-layer coextruded structure 0.6 mils thick per layer as that of Examples 30-2. The second ply was another 3-layer (20%-60%-20%) coextruded structure 0.6 mils thick of somewhat different structure. The core was a LLDPE material, and the outer skins included a $C_8$ olefin for improved affinity.

Figure 31:
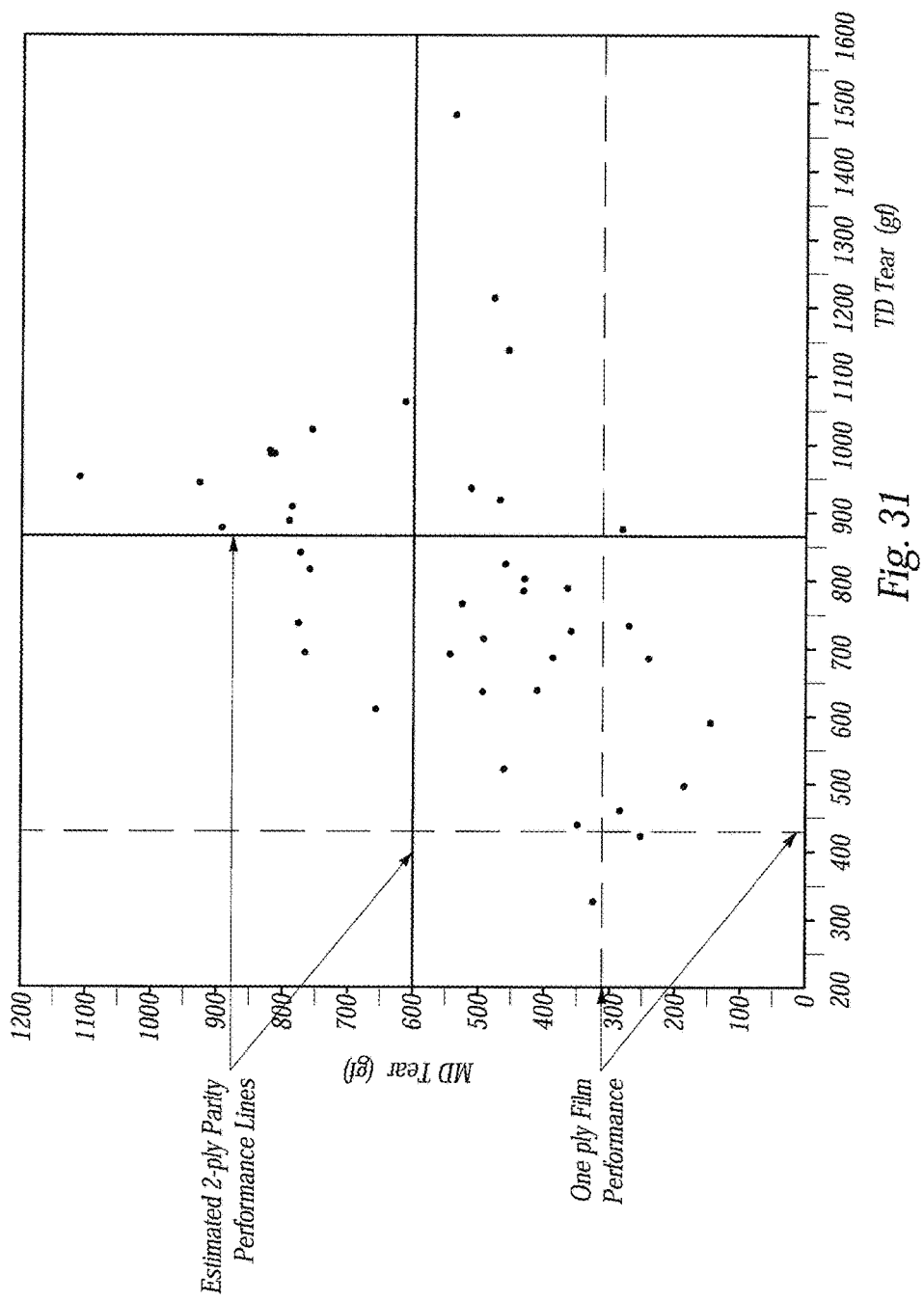
FIG. 31 is a scatter plot of MD and TD tear resistance values for additional tested multi-layered lightly-laminated films.
Figure 33A:
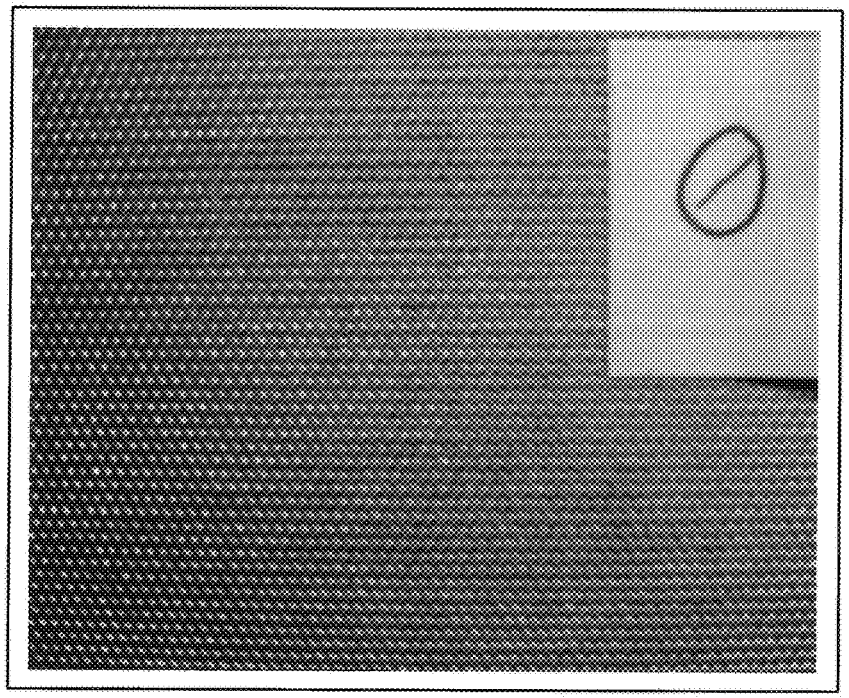
FIGS. 33A-33H are photographs showing various bond patterns used in ultrasonic bonding of the multi-layered lightly-laminated films of FIG. 32.
Figure 33B:
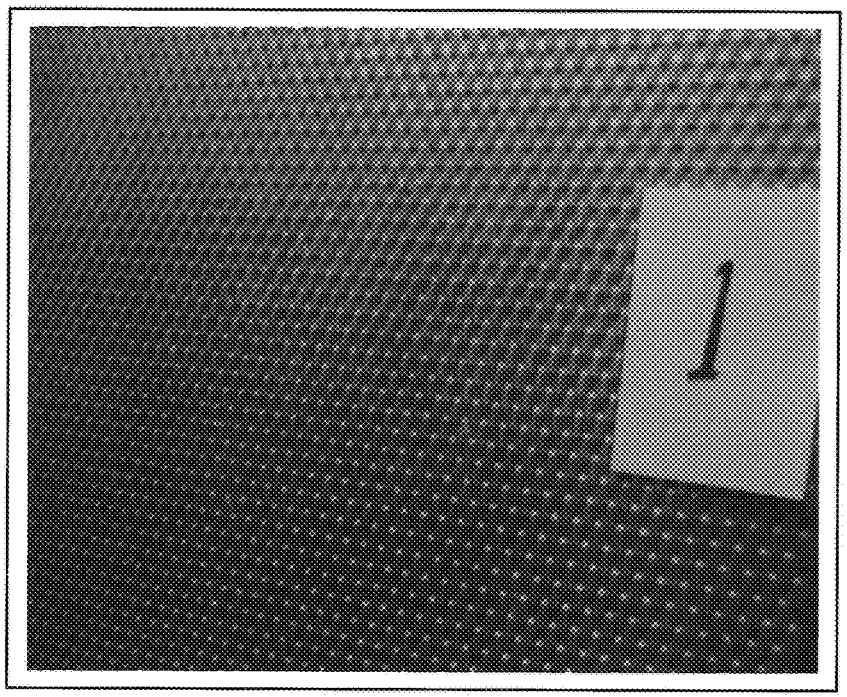
Figure 33C:
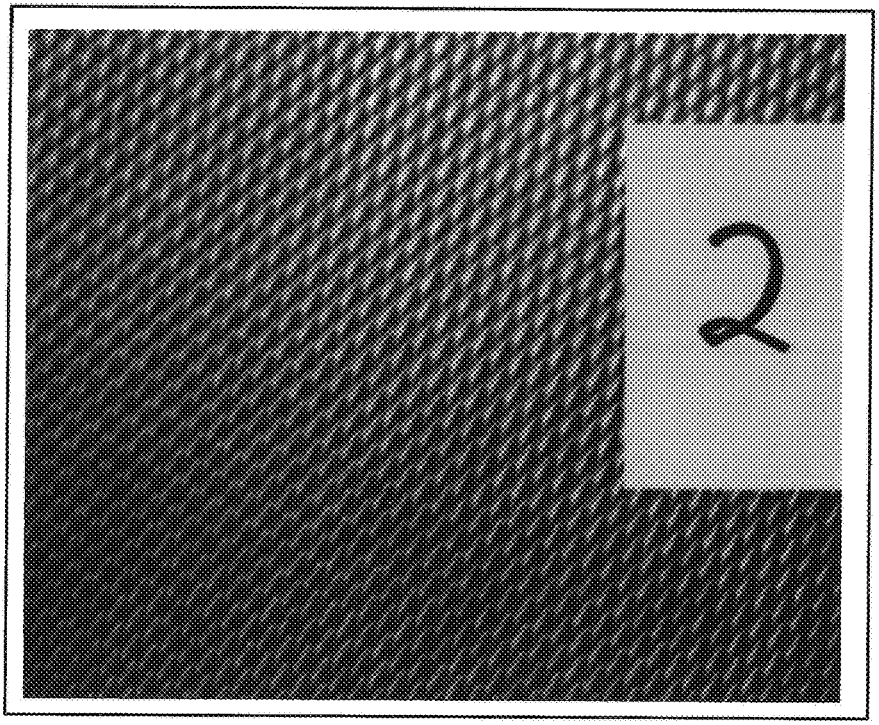
Figure 33D:
Figure 33E:
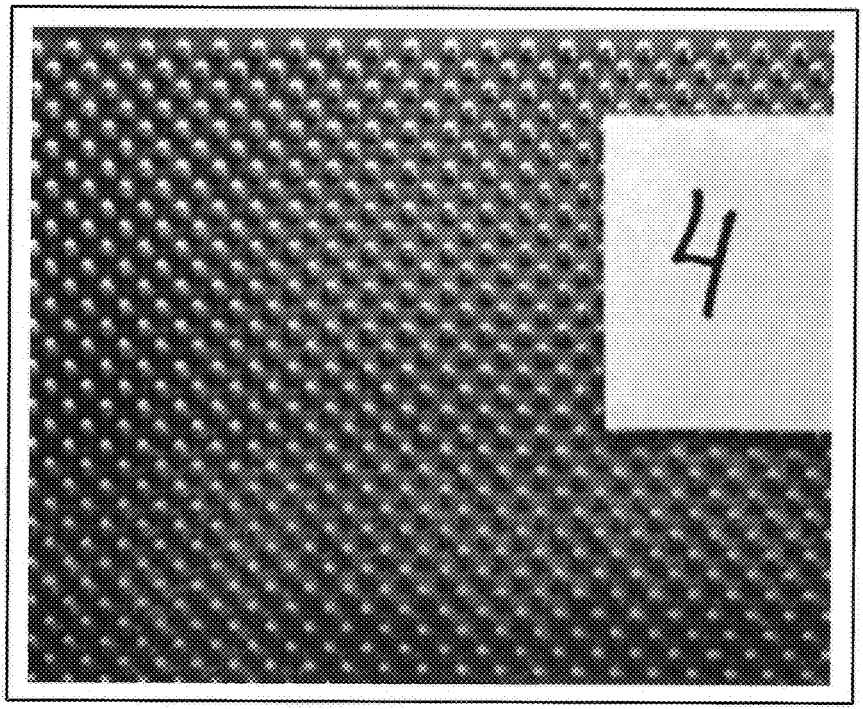
Figure 33F:
Figure 33G:
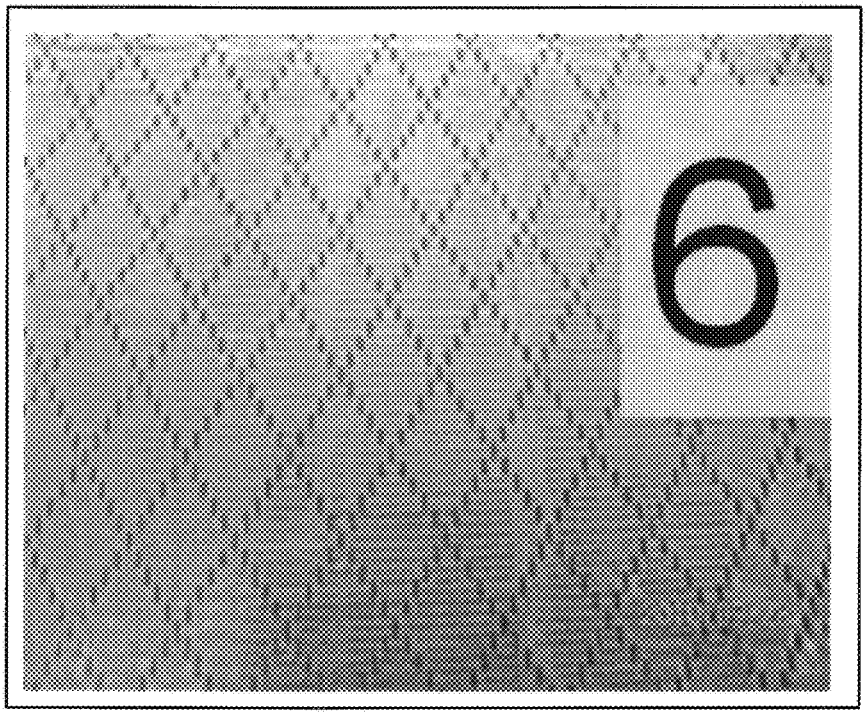
Figure 33H:
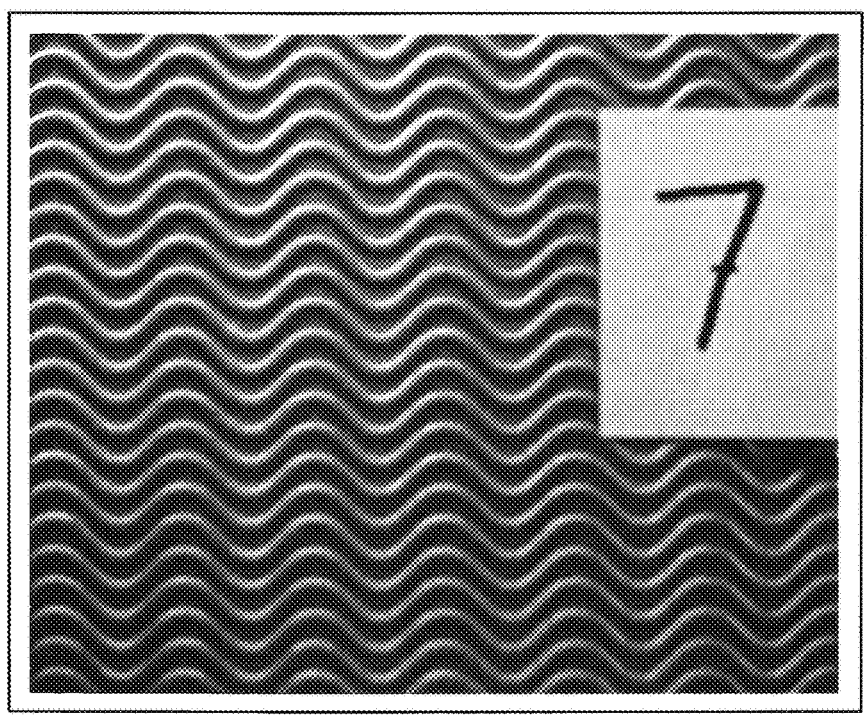

FIGS. 31-32 display MD and TD tear performance for various multi-layered lightly-laminated films that were ultrasonically bonded together. The testing of these examples varied film composition, ultrasonic bond pattern, and relative bond strength. The scatter plot chart of FIG. 31 shows all data points, including baseline control data points which were not discontinuously bonded. Almost all (all but 6) of the data points corresponding to samples that were ultrasonically discontinuously bonded exhibit both greater MD tear resistance and greater TD tear resistance than the expected single layer performance. In addition, many of the data points (i.e., those in the upper right quadrant) represent MD and TD tear resistance values greater than even additive performance double that of single layer performance. FIG. 32 is a chart including all of the MD and TD tear values for each data point shown in the scatter plot of FIG. 31.

Film A is a LLDPE ($\rho$=0.9194 g/cm³, MI=1.01) film including skin layers of Affinity 8100 ($\rho$=0.8697 g/cm³, MI=1.18) for improved adhesion of adjacent layers as a result of discontinuous lamination. It was run at a blow up ratio (BUR) of 3.2. Film B is identical to film A, but run at a BUR or 2.0. Film C is made of layers of substantially pure LLDPE material ($\rho$=0.919 g/cm³, MI=1.00) made without any anti-block component so as to better encourage tackiness and adhesion between adjacent layers during discontinuous lamination. Each layer had a thickness of about 0.6 mils.

The two layers were ultrasonically bonded using a variety of bond patterns using a Branson 900 ultrasonic scan bonder. Table speed was set to "3". Horn loading pressure varied between about 50% and about 65% for the various samples. Power supply varied between about 70% and about 85% for the various samples. The bond pattern codes 0-7 were as shown in Table X. FIGS. 33A-33H show photographs of the various patterns of Table X.

TABLE X

| Pattern Code | Description |
|---|---|
| 0 | Fine mesh honeycomb |
| 1 | Diamond pattern of 2 mm × 5 mm elements |
| 2 | Diagonal twill pattern of 2 mm × 5 mm elements |
| 3 | Striped pattern of 0.05" × 0.15" elements |
| 4 | Diamond pattern of 0.0625" × 0.125" elements |
| 5 | Diamond pattern of 0.075" diameter dots |
| 6 | Diamond pattern of 0.025" × 0.125" elements (tips) |
| 7 | Continuous TD wave pattern, 0.06" elements |

The present invention may be embodied in other specific forms without departing from its spirit or essential characteristics. For example, the illustrated and described implementations involve non-continuous (i.e., discontinuous or partially discontinuous lamination) to provide the light bonds. In alternative implementations, the lamination may be continuous. For example, multi film layers could be co-extruded so that the layers have a bond strength that provides for delamination prior to film failure to provide similar benefits to those described above. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A thermoplastic bag, comprising:
    a first layer of thermoplastic material, the first layer including first and second side walls joined along a bottom edge, a first side edge, and an opposing second side edge;
    a second layer of thermoplastic material, the second layer including first and second side walls joined along a bottom edge, a first side edge, and an opposing second side edge; and
    a plurality of discrete non-adhesive bonded regions in which the first and second layers are cold bonded directly together; and
    a plurality of unbonded regions alternating with the plurality of bonded regions, the unbonded regions including discrete areas in which the first and second layers are not bonded to one another;
    wherein a bond strength of the bonded regions is less than a weakest tear resistance of either the first or second layers; and
    wherein a machine direction of the first layer is parallel to a machine direction of the second layer.

2. The bag as recited in claim 1, wherein the bond strength of the bonded regions is less than a weakest MD tear resistance of either the first or second layer.

3. The bag as recited in claim 1, wherein the bonds are ultrasonic bonds.

4. The bag as recited in claim 1, wherein the first layer comprises a tackifier that increases a tackiness of the first layer.

5. A multi-layered thermoplastic bag, comprising:
    a first layer of thermoplastic material including first and second side walls joined along a bottom edge, a first side edge, and a second opposing side edge;
    a second layer of thermoplastic material including first and second side walls joined along a bottom edge, a first side edge, and a second opposing side edge; and
    a plurality of discrete cold-formed non-adhesive bonds directly securing the first layer of thermoplastic material to the second layer of thermoplastic material;
    wherein the bonds have a bond strength less than a force required to fail either the first layer or the second layer;

wherein a machine direction of the first layer of thermoplastic material is parallel to a machine direction of the second layer of thermoplastic material.

6. The bag as recited in claim 5, wherein the bonds are non-continuous.

7. The bag as recited in claim 5, wherein the bonds comprise one or more of mechanical pressure or ultrasonic-bonds.

8. The bag as recited in claim 5, wherein the bonds are joined at incrementally-stretched regions of the first and second layers.

9. The bag as recited in claim 5, further comprising varying one or more of a pattern, size, or number of the bonds to control bond strength.

10. The bag as recited in claim 5, wherein the bonds provide less resistive force to an applied strain than molecular-level deformation of either the first layer or the second layer.

* * * * *